US006950990B2

(12) United States Patent
Rajarajan et al.

(10) Patent No.: US 6,950,990 B2
(45) Date of Patent: Sep. 27, 2005

(54) NAVIGATION TOOL FOR ACCESSING WORKSPACES AND MODULES IN A GRAPHICAL USER INTERFACE

(75) Inventors: Vij Rajarajan, Redmond, WA (US); Kishnan Nedungadi, Rio de Janeiro (BR); Casey Kiernan, Kirkland, WA (US); Mel MacMahon, Kirkland, WA (US); James Johnston, Redmond, WA (US); Lauren Gallagher, Redmond, WA (US); Kevin Hodge, Bellevue, WA (US); Tom Martino, Everett, WA (US); Annette B. Hall, Bellevue, WA (US); Cary Rohwer, Dovall, WA (US); Audrius Zimnickas, Vilnius (LT)

(73) Assignee: Microsoft Corporation, Redmond, WA (US)

(*) Notice: Subject to any disclaimer, the term of this patent is extended or adjusted under 35 U.S.C. 154(b) by 620 days.

(21) Appl. No.: 10/015,050

(22) Filed: Dec. 11, 2001

(65) Prior Publication Data

US 2002/0149615 A1 Oct. 17, 2002

Related U.S. Application Data

(60) Provisional application No. 60/255,044, filed on Dec. 11, 2000, provisional application No. 60/255,051, filed on Dec. 11, 2000, provisional application No. 60/255,238, filed on Dec. 11, 2000, provisional application No. 60/255,041, filed on Dec. 11, 2000, provisional application No. 60/255,153, filed on Dec. 11, 2000, provisional application No. 60/255,043, filed on Dec. 11, 2000, provisional application No. 60/255,050, filed on Dec. 11, 2000, provisional application No. 60/255,042, filed on Dec. 11, 2000, and provisional application No. 60/255,052, filed on Dec. 11, 2000.

(51) Int. Cl.[7] ........................... G06F 3/00; G06F 11/32; G09G 5/00

(52) U.S. Cl. ...................... 715/736; 715/733; 715/781; 715/804; 715/738; 715/513; 709/223

(58) Field of Search .................................. 715/700, 733, 715/736, 738, 744, 762, 764, 765, 781, 786, 788, 804, 805, 810, 843, 853, 513, 517; 709/217, 223

(56) References Cited

U.S. PATENT DOCUMENTS

5,394,521 A * 2/1995 Henderson et al. ......... 345/804
5,471,399 A   11/1995 Tanaka et al. ............. 364/491

(Continued)

FOREIGN PATENT DOCUMENTS

EP   0 813 139 A2   12/1997

OTHER PUBLICATIONS

Greg R. Notes, "On The Nets", Online, 1996, 20, 5, p. 65–68.*

(Continued)

Primary Examiner—X. L. Bautista
(74) Attorney, Agent, or Firm—Merchant & Gould P.C.

(57) ABSTRACT

A method and system for displaying information related to a plurality of resources in a network environment. The system uses web technology to receive and store information related to back-end resources and to provide a framework by which client computer systems can manage the plurality of back-end resources in a uniform manner. In accordance with one embodiment, a method is employed in a computer system for selecting the visual arrangement of workspaces and modules in a network management console GUI. The console includes a first zone and a second zone. The method involves receiving a list of workspace names and, in response, displaying an explorer tool including the list of workspace names in the first zone. Upon indication from a user that a first workspace name from the list of workspace names has been selected, a first workspace associated with the first workspace name is displayed in the second zone.

21 Claims, 23 Drawing Sheets

U.S. PATENT DOCUMENTS

| | | | | |
|---|---|---|---|---|
| 5,481,741 | A | | 1/1996 | McKaskle et al. .......... 395/800 |
| 6,002,398 | A | | 12/1999 | Wilson ....................... 345/346 |
| 6,078,920 | A | | 6/2000 | Tan et al. ..................... 707/10 |
| 6,272,493 | B1 | * | 8/2001 | Pasquali ...................... 707/10 |
| 6,307,573 | B1 | * | 10/2001 | Barros ........................ 345/764 |
| 6,337,696 | B1 | * | 1/2002 | Lindhorst et al. ........... 345/763 |
| 6,344,859 | B1 | * | 2/2002 | Alimpich et al. ........... 345/762 |
| 6,631,402 | B1 | * | 10/2003 | Devine et al. .............. 709/217 |
| 2004/0153509 | A1 | * | 8/2004 | Alcorn et al. ............... 709/205 |

OTHER PUBLICATIONS

Eva Schroeter et al, "An Application Interface With Multiple Workspaces: The Context Switcher", 1996, IEEE, p. 318–319.*

"Wyse puts new spin on thin client", Jun. 1999, Network World, v16, n24, p. 20.*

Brent Dorshkind, "Microsoft Server", Jun. 1992, LAN Technology, v8, n6, p89(1).*

John Bass et al, "King of the NOS hill Netware holds the performance reins, but Windows 2000 reigns supreme for features overall", Jan. 2000, Network World, p. 71.*

S. P. Reiss, "Cacti: a front end for program visualization", Oct. 1997, Information Visualization, IEEE, vol., Iss., 20–21, p. 46–49 120.*

Jong–Tae Park et al, "Web–based customer network management", Jun. 1997, IEEE, vol., Iss., 11–12, p. 160–169.*

John Bass, "Remote control hardware options Vendor–specific add–on cards outperform stand–alone devices", Mar. 2000, Network World, p.53.*

"The Programmable Web: Web Services Provides Building Blocks for the Microsoft.NET Framework", Mary Kirtland, MSDN Magazine, msdn online at msdn.Microsoft.com.

* cited by examiner

NAVIGATION TOOL FOR ACCESSING WORKSPACES AND MODULES IN A GRAPHICAL USER INTERFACE

CROSS-REFERENCE TO RELATED APPLICATIONS

This application claims priority of the following U.S. provisional applications, all of which are incorporated herein by reference: Ser. No. 60/255,044, filed Dec. 11, 2000, titled Framework for Web-Based Integration of Management Applications; Ser. No. 60/255,051, filed Dec. 11, 2000, titled Schema Driven User Task Architecture; Ser. No. 60/255,238, filed Dec. 11, 2000, titled Schema Driven Property Pages; Ser. No. 60/255,041, filed Dec. 11, 2000, titled Schema Driven Search; Ser. No. 60/255,153, filed Dec. 11, 2000, titled Search Engine Extensibility; Ser. No. 60/255,043, filed Dec. 11, 2000, titled Management Portal Explorer; Ser. No. 60/255,050, filed Dec. 11, 2000, titled Object Property Representation; Ser. No. 60/255,042, filed Dec. 11, 2000, titled Quick Search; and Ser. No. 60/255,052, filed Dec. 11, 2000, titled Mmp Modules—Query Driven Model For Location Objects and Tasks.

This application is related to the following commonly assigned United States patent applications, all of which were filed concurrently with this application, and all of which are incorporated herein by reference: Ser. No. 10/014,120, filed Dec. 11, 2001, titled User Interface for Managing Multiple Network Resources; Ser. No. 10/014,177, filed Dec. 11, 2001, titled Method and System for Management of Multiple Network Resources; Ser. No. 10/014,114, filed Dec. 11, 2001, titled System and Method for Representing an Object Used in Management of Multiple Network Resources; Ser. No. 10/015,129, filed Dec. 11, 2001, titled Method and System for Query-Based Management of Multiple Network Resources; and Ser. No. 10/014,293, filed Dec. 11, 2001, titled Method and System for Task-Based Management of Multiple Network Resources.

TECHNICAL FIELD

The present invention relates to methods and systems for managing multiple resources in a network environment. More particularly, the present invention relates to providing a method and system for performing scenario-based tasks requiring interaction with multiple resources while providing a uniform user-interface for each of the multiple resources.

BACKGROUND OF THE INVENTION

Network administrators, also known as information technology staff, perform many operations throughout each day in order to manage a number of different resources associated with their respective networks. These networks may comprise any number of hardware related computer resources, e.g., printers, computer stations, servers, etc., as well as a number of software related resources, such as databases, employee profiles, email servers, applications, among others. Typically, each of these resources has a uniquely different front end or user interface that the administrator must use to modify, evaluate or otherwise configure that resource. Consequently, in order to perform their duties, administrators must be familiar with many different types of systems.

The resources are typically managed directly at the resource itself, or remotely via a two-tier type of connection. The two-tier system involves (1) a client computer system or "front-end" and (2) the resources themselves or "back-end". In the two-tier model, the client computer system must be connected to the resources, potentially through a network server, and have all the necessary software installed on the front-end to effectively manage the resources. The software relates to the front-end user interface for each different resource.

One of the problems associated with this two-tier system, in terms of network administration, is that it is necessary to store and manage the appropriate "front-end" applications for each resource, or set of related resources, at each client location where network administration will take place. By placing the appropriate "front-end" applications at the client computer level, the two-tier architecture requires a significant and ongoing investment in technology, software, and data updates.

An additional drawback to this two-tiered system is that each of the resources and their respective front-end user interface applications operate uniquely and independently for each of the resources being managed. Therefore, when a complex multi-step task (or complex scenario) must be performed, the independence of the resources requires that each separate front-end be accessed to perform functions associated with performing one step of the multi-step task or otherwise performing the individual parts of the scenario. For example, in order to add a new user to a network system, many tasks must be completed, such as adding the user to the employee database, setting up the user's computer, setting up an email account for the user, providing the user with a security badge, etc. The independent nature of the various resources required to perform these tasks results in multiple, sometimes-repetitive actions that must be performed for each front-end application each time a certain task must be completed. For instance, when trying to find information associated with a task, such as a particular user, many different resources must be accessed, again, using unique front-end applications, to search for the information relevant to a particular topic. Unfortunately however, accessing different resources in this manner is time consuming and requires a mastery of many types of applications and front-ends.

Another drawback associated with network administration, as so far described, is that in order to effectively manage each of the varied resources associated with a given network, a network administrator must be expertly familiar with each of the "front-end" applications or user interfaces that are used to control the resources. As such, significant training time and expense is required for an administrator to learn, and keeping current with, the functioning of each of the varied resources associated with the network, as well as the various associated front-end applications or user interfaces.

It is with respect to these and other considerations that the present invention has been made.

SUMMARY OF THE INVENTION

This invention relates to a management system for managing computer-related resources within a distributed or network relationship. The management system or "portal", also uses web technology, preferably XML-technology, to reduce the overhead associated with existing management tools that depend heavily on a two-tier system having client computer systems connected to the computer resources themselves—which are inherently non-uniform in nature and make administration of computer systems difficult. In an embodiment of the invention, the management tool is a scalable, web-based management framework that manages a plurality of back-end resources in a uniform manner. The resources communicate with the management system via a conforming dialog, which is schema driven. Using these communications, the management system uniformly associates information from the various resources via various multi-step, scenario-based functions, such as, for example, searches, monitoring, scripting, software deployment, etc. That is, the management system is able to provide easier, higher-level operation options to the administrator based on the associated information related to the various resources.

With respect to certain aspects, an embodiment of the present invention relates to a method in a computer system for selecting the visual arrangement of workspaces and modules in a network management console graphical user interface. In this embodiment, the console includes a first zone operable to display tools and a second zone operable to display workspaces and modules. In this embodiment, the method involves receiving a list of workspace names, each workspace name associated with a workspace; displaying an explorer tool in the first zone, the explorer tool displaying the list of workspace names; receiving from a user an indication that a first workspace name from the list of workspace names has been selected; and displaying in the second zone a first workspace associated with the first workspace name.

The method of this embodiment may further include displaying in the explorer tool a list of module names, wherein each module name is associated with a module that is associated with the first workspace. The method may also include receiving from the user an indication that a first module name from the list of module names has been selected. In response thereto, a first module associated with the first module name in the first workspace may displaying be in the first workspace. Additionally, the explore tool may include an explorer tool bar. In such a case, the list of workspace names may be displayed as an explorer drop-down menu extending from the tool bar. Further more, the list of module names may be displayed as a drop-down menu extending from a selected workspace name in the explorer tool.

Another embodiment of the present invention relates to a display device having rendered thereon a network management console for displaying and accessing objects from a plurality of network resources. In this embodiment, the console has rendered therein a second zone including a selected workspace, the selected workspace including at least one module. The console also has rendered therein a first zone including an explorer tool. The explorer tool displays a list of workspace names and a list of module names. The list of workspace names include a workspace name associated with the selected workspace and the list of module names includes a module name associated with the at least one module. In this embodiment, the explorer module may further include an explorer tool bar, wherein the list of workspace names is displayed in a drop down menu extending from the explorer tool bar. Additionally, the explorer may further include a visual indicator indicating that the workspace associated with the selected workspace name is included in the second zone. The explorer further also include a visual indicator indicating that the module associated with the at least one module name is included in the selected workspace.

Various embodiments of the the invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of presently preferred embodiments of the invention, and to the appended claims.

DETAILED DESCRIPTION OF THE INVENTION

Figure 1:
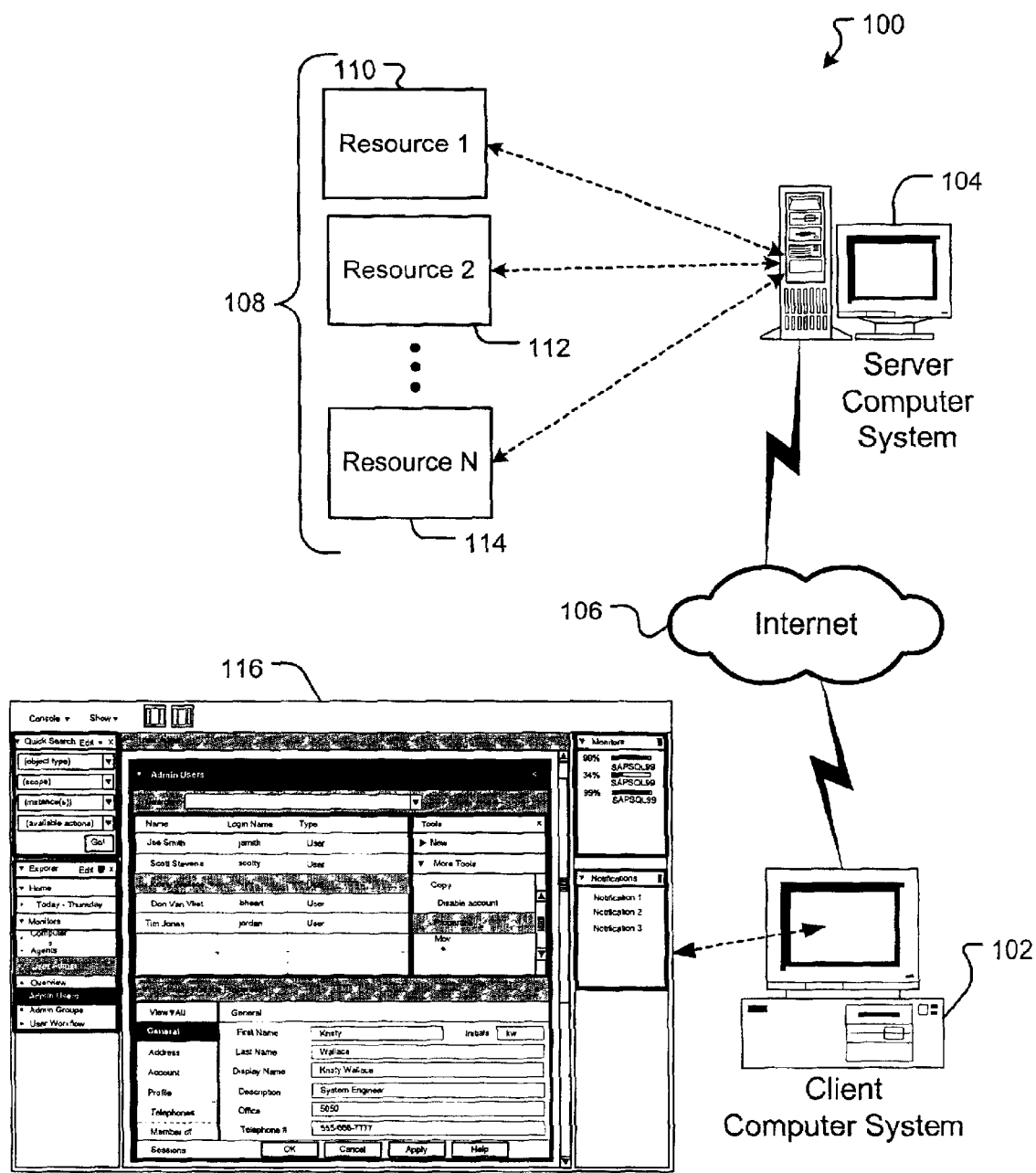
FIG. 1 illustrates a distributed network system incorporating aspects of the present invention.

A distributed environment 100 including aspects of the present invention is shown in FIG. 1. The environment 100 has at least one client computer system, such as client computer systems 102 that communicates with at least one server computer system, such as server computer system 104, in a distributed environment 106, such as the Internet or some other distributed environment, e.g., a WAN, LAN, etc. The server computer system 104 is used to manage one or more resources 108. The resources 108 generally relate to computer-resources that may be managed by a network administrator. The resources 108, may include hardware devices, such as printers, workstations, servers, etc. and software related elements such as databases, security systems, email accounts and user accounts, among others. For example, Resource 1, shown as 110 in FIG. 1, may be an email system that controls the email for a particular network, and where Resource 2, shown as 112 relates to all the printers for that network. As may be appreciated, the network may have any number of resources, as shown by Resource N 114, wherein "N" relates to any variable number of resources.

Importantly, the type and scope of the resources 108 is most likely different from one network to another and, therefore, the scope of the present invention relates to manageable resources in general, as opposed to one specific set of resources. Additionally, potentially new and different resources that may be managed using aspects of the present invention may emerge over time and the present invention is not limited by the fact that these resources were not available previously. Indeed, use of the present invention lends itself to the generation of new and different resources that operate in conjunction with the present invention.

The resources 108 are operably connected to the server computer system 104 such that information can be sent to and received from the resources. These connections are common in distributed environments, and may be wireless or not. The protocols used to communicate between the resources and server computer system may be proprietary to the resource and/or the server 104. However, the protocol used should preferably allow for ability to control various features of the resources, such as being able to modify the configuration of the resource, such as being able to update its database, change its security options, etc.

The client computer system 102 may communicate with the server computer system 104 via many different protocols over various types of connections. As shown in FIG. 1, the systems 102 and 104 may communicate via the Internet 106 using Hypertext Transfer Protocol (HTTP), mark-up languages, or some other communication protocol suitable for use with, for example, the Internet. In a particular embodiment, client computer system 102 is a Microsoft- .NET client, but other, non-Microsoft.NET clients may be used.

During operation, the client computer system 102 accesses information from the server computer system 104. The information accessed relates to the various resources 108. Once accessed, client computer system 102 displays a graphical user interface 116 to be used in managing the resources 108 or, in other embodiments, command line interfaces may be used. The client computer system 102 has a graphical user interface 116 to provide effective management capabilities of computer resources 108 through the server computer system 104. Alternative embodiments, however, do not use the graphical user interface (GUI) 116, but instead use other means of providing and receiving information from and to the user of the client computer system 102. As discussed in more detail below, the interface provides consistencies with respect to being able to manage the various resources, even though each resource may still have some of its own unique characteristics.

In one embodiment, the present invention relates to a browser application that operates in conjunction with a management module or system to coordinate operations and events behind a firewall, such as between the server computer system 104 and the resources 108. In a particular embodiment, the management system is integrated with an "Enterprise Namespace" (which catalogs objects and tasks across an operational domain) and all user interactions are schema driven using distributed services to perform all management tasks. That is, all interaction between the browser application and the management module is expressed in XML or some other schema-driven language.

Similarly, communications between the management system and other resources may also conform to a defined schema. Requiring conforming communications between resources and the management layer provides the ability to share or associate related information from different resources and to logically combine sub-functions and property information. In turn, using the associated information, the management module may provide advanced capabilities to the user by allowing task or scenario-based operations that effectively manage the multiple resources 108 in response to merely a few requests, e.g., one request to add a user may effectively modify information in two or more resources. As discussed in more detail below, the management module may include many different sub-modules or components that carry out various multi-step task or scenario-based management functions. Additionally other modules may also be incorporated to perform scripting functions (not requiring a User Interface), searching functions, customization and/or other administrative functions using the associated information from the plurality of resources 108.

Figure 2:
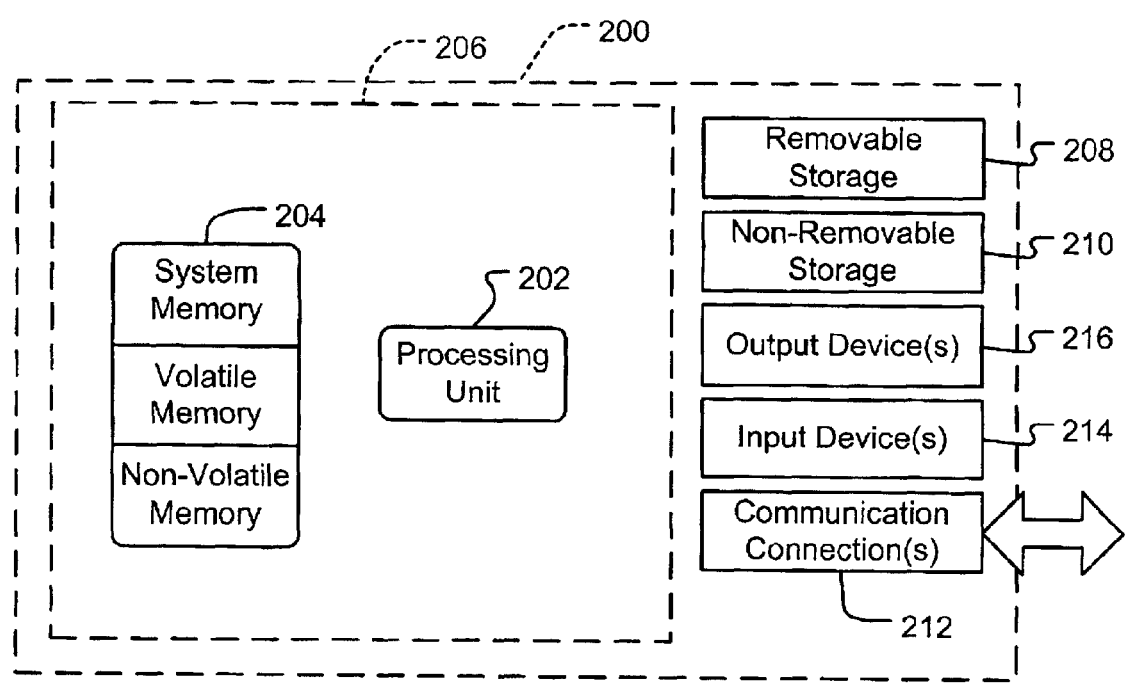
FIG. 2 illustrates a computer system incorporating aspects of a resource management system according to the present invention.

An exemplary computer system 200 that may be used to perform the functions of either the client computer system 102 or the server computer system 104 to manage the various resources 108 within the system 100 according to the present invention is shown in FIG. 2. The system 200 has a processing unit or processor 202 and memory 204. In an alternative embodiment of the invention, the system may have multiple processors (not shown).

In its most basic configuration, the computing system 200 is illustrated in FIG. 2 by dashed line 206. Additionally, the system 200 may also include additional storage (removable and/or non-removable) including, but not limited to, magnetic or optical disks or tape. Such additional storage is illustrated in FIG. 2 by removable storage 208 and non-removable storage 210. Typically, the bulk of the database information is stored in such additional storage. Computer storage media includes volatile and nonvolatile, removable and non-removable media implemented in any method or technology for storage of information such as computer readable instructions, data structures, program modules or other data. Memory 204, removable storage 208, and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the system 200. Any such computer storage media may be part of system 200. Depending on the configuration and type of computing device, the memory 204 may be volatile, non-volatile or some combination of the two.

The system 200 may also contain communications connection(s) 212 that allow the device to communicate with other devices. The communications connection(s) 212 is an example of communication media. The communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices are well known in the art and need not be discussed at length here.

Figure 3:
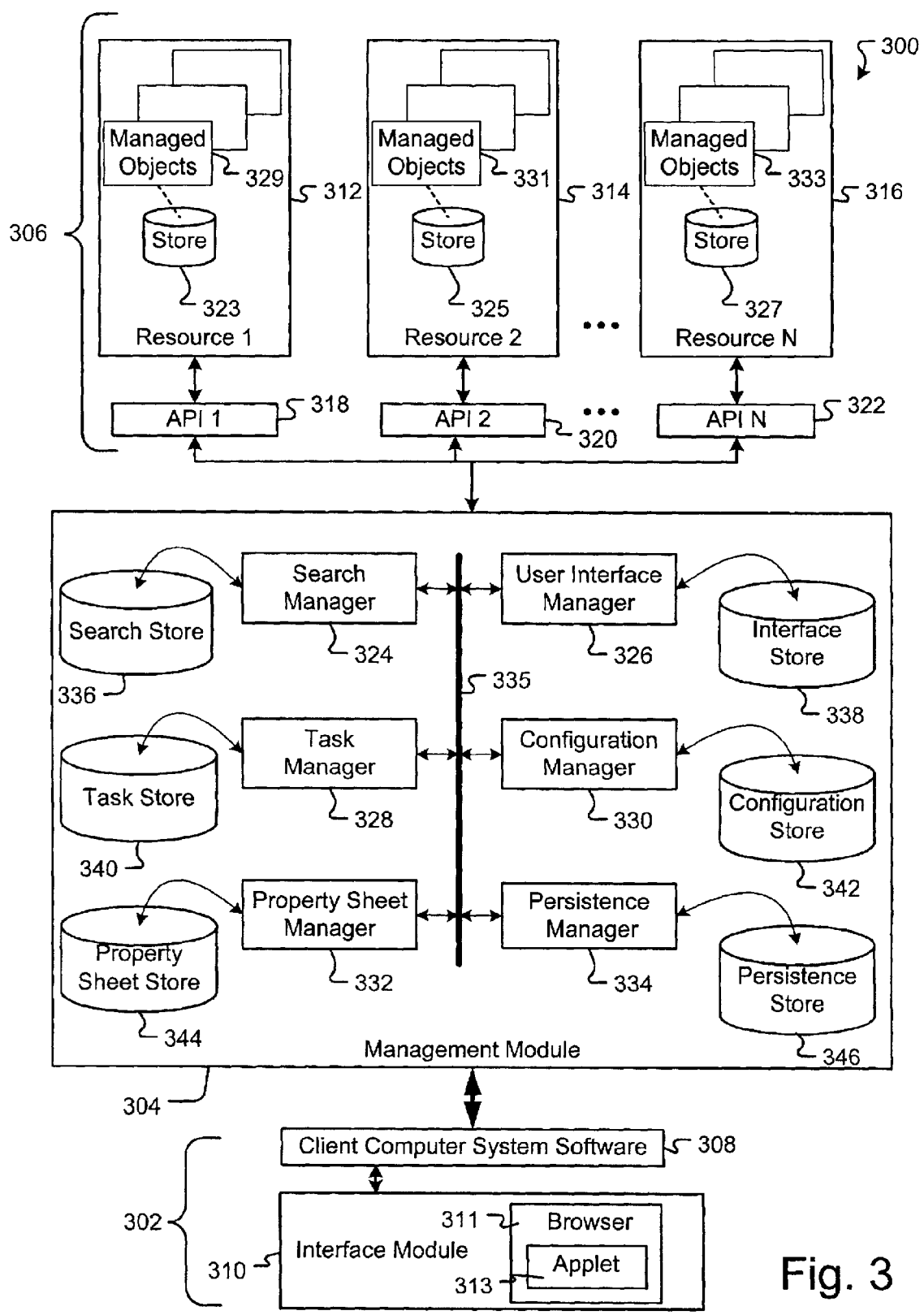
FIG. 3 illustrates a software environment for implementing the present invention, the software environment including a resource management system of the present invention as well as various resources managed by the resource management system and managed objects with the managed resources.

In an embodiment, a software environment 300 incorporating aspects of the invention may be illustrated as shown in FIG. 3. The environment 300 includes three components: a client computer system 302, a management module 304, and resources 306. A first component 302 relates to the client computer system 302, which is used by a network administrator to manage various resources. The second component 304 relates to a management module that communicates with the client computer system 302 to facilitate management of resources 306.

In an embodiment, the system 302 includes client computer system software 308 and a user interface module 310. The client computer system software 308 provides several functions. For instance, the software 308 communicates with the management module 304 to provide requests for information and/or requests for tasks to be completed. This communication may be performed in any number of ways, e.g., it may involve the transfer of information across a network connection, such as the Internet or it may involve communication between two separate processes in a single machine. Some of these various connections are discussed above with respect to FIG. 1.

Additionally, the client computer system software 308 also communicates with or provides functionality to the user through the user interface module 310. The user interface module 310 may employ a GUI, such as GUI 116 shown in FIG. 1, or may employ a command line interface. In one embodiment, discussed in detail below, the user interface includes a web browser application 311 to present the GUI 116. To facilitate the presentation of the GUI in the web browser 311, the interface module 310 may also include an applet 313. Details regarding both the web browser 313 and the applet 313 are provided below. The user interface 310 may further include other elements such as input elements, e.g., keyboards, touch screens, touch pads, mice, among others. The user interface 310 may also include output elements such as the graphical user interface 116, as shown in FIG. 1, or other output elements such as printers, speakers, etc. An end user, such a network administrator, communicates with the computer system software 308 through the user interface module 310. In turn, the computer system software 308 communicates with the management module 304 to effectively manage resources 306.

With respect to the resources 306 shown in FIG. 3, the resources 312, 314, 316 are similar to resources 110, 112, 114 shown in FIG. 1. Again, these resources may relate to any computer resource that may be managed by a network administrator. These resources may involve software and/or hardware components. The resources may further include resource APIs, such as APIs 318, 320, 322. Resource APIs relate to application program interface modules that allow communication between the resource itself and a separate computer system, such as the management system 304. These APIs may be standard or custom designed to facilitate communication and eventual management of the resources.

In an embodiment, each of the resources 306 has a datastore, such as datastores 323, 325 and 327 for storing information related to that resource. Additionally, each resource 306 manages one or more objects, such as objects 329, 331 and 333. An object is a particular set of data and information describing that data. For instance a user object may relate to a particular user in the network and the object may include relationship or meta information about the user. Of course, the various resources may manage other objects, such as objects relating to specific hardware units, e.g., printers or workstations, or to events or operations. Typically, the information stored about an object relates to particular properties or attributes assigned to the object. In the example relating to a user object, the information may identify attributes such as, for example, name, address, title, etc. In addition, the information stored may also indicate the type of actions that can be taken with respect to an object, e.g., edit user information, delete user object, etc.

In a particular embodiment, resources may be created by a resource developer. Before creating a resource, a developer must know what objects, e.g., objects 329, will be managed, and what object tasks will be available to the user of the resource in managing those objects. For example, an object may relate to system users, and a task may involve resetting a user's password. Next, the following XML documents may be created: (1) an Object Type XML document, which provides a description of the object types used by the plugin; (2) a Plugin Information XML document which provides plugin configuration and version information; (3) a Property Sheet XML document which provides property sheet information; and (4) a Task XML document which provides information about the tasks available for the plugin's objects. The XML documents can be created using any text editor or XML authoring tool. The XML documents describe the plugin and the plugin objects, tasks, and property sheets.

Next, in this embodiment, a Microsoft ".NET Framework" assembly is created. The assembly for the plugin may implement the following interfaces: IPluginPropertySheet, IPluginScope, and IPluginSearch, which, in general, implement methods for managing property sheets, search functions and other elements of the plugin. In order to manage the plugin, these interfaces may be accessed by the system management environment 304.

The management module 304, which may be present on a server computer system such as 104 shown in FIG. 1, provides a "middle tier" of the management system 100 shown in FIG. 1. In a particular embodiment, the environment 300 is based on the Microsoft ".NET" framework. The server-side functionality may potentially be written in C# and communicate via IIS and ASP+ and be hosted on a single server or on a web farm. The management module 304 may be located in a separate domain to the client and also to the managed resources and communication can take place between firewalls. In this embodiment, the managed resources can be written in any NET compliant language, for example, C# or VB.NET. The managed resources preferably also expose certain web services to facilitate communication with the management module 304. Additionally, the management module 304 may be a web service associated with the .NET framework. Web Services are described in more detail in the article titled "The Programmable Web: Web Services Provides Building Blocks for Microsoft NET Framework" from the magazine "MSDN Magazine" September 2000 issue.

The management module 304 uses many elements to facilitate management of the resources 306. In an embodiment of the invention, the management module 304 has a plurality of managers that operate relatively independently to perform various functions in managing the resources 306. Each manager may further have a store of information that resides on the computer system housing the manager itself, as discussed in more detail below. In an embodiment of the invention, the management module 304 has a search manager 324, a user interface manager 326, a task manager 328, a configuration manager 330, a property sheet manager 332, and a persistence manager 334. In alternative embodiments the management module 304 may include other managers. Moreover, in yet other embodiments, the management module may incorporate fewer managers than shown in FIG. 304. The various managers communicate with each other as indicated by connection 335 shown in FIG. 3.

In general, a manager is a component that is data driven so that it is available relatively automatically in the management module 304 for use by any other manager or component within system 304. In addition, other management hosting user-interface components may be incorporated into the module 304 as needed for specific administrative functions, e.g., user management, operations management, configuring services, etc. These components may be created by third parties and used to provide specific user-interface support for their specific resources.

With respect to the user interface manager 326, the manager 326 provides the interface functionality between the management module 304 and the client computer system software 308. In an embodiment, the user interface module provides many advanced features, e.g., the user interface manager 326 may customize output information for a particular client computer system. Consequently, the user interface manager 326 allows for the use of many different types of client computer systems, e.g., laptops, desktops, PDAs, cell phones, etc. The user interface manager communicates with the client computer system to provide the proper format and amount of output information, as well as input information. Furthermore, the user interface manager may adapt to many different network protocols which may be used across the distributed network.

Details of the user interface manager 326 and the interaction between the management module 304 and a web browser operation on the client computer system 302 are provided below.

In general, the persistence manager 334 functions to store various predefined and authored layouts of a management console graphical user interface (console layouts) that is described in detail below. The persistence manager preferably stores these console layouts as XML type files in a memory, such as persistence store 346, shown in FIG. 3.

With respect to the search manager 324, it generally parses and performs search operations on portions of data stored and used on the system 300. Typically, the search manager receives a query from the client computer system software 308, and performs the query using information stored in search store 336 as well as through functional interaction with the back-end resources 306 to thereby supply search results back to the client 308.

Similarly, the task manager 328 receives task requests from the client computer system software 308 and is involved in executing those tasks. The tasks generally relate to actual management or configuration type tasks, such as adding new users to the network, but may also refer to other tasks such as providing task related information to the user. The task manager 328 may perform tasks by interaction with one or more back-end resources 306. To carry out a requested task, the task manager 328 has instructional information stored in task store 340 used to recognize the functions to be performed in carrying out a specific task, such as, for example, which resources must be notified or used in performing the task. For instance, in adding a new user to the network, the task manager 328 may need to send new user information to an employee database managed by a SQL server, to an email server and to a security-clearance application, among others. In such a case, the task manager may store, in task store 340, the set of application or resources that must be notified of the fact that a new user is being added. The task manager 328, the search manager 324 and other managers are discussed in more detail below as they relate to the actual management of the resources 306.

Figure 4:
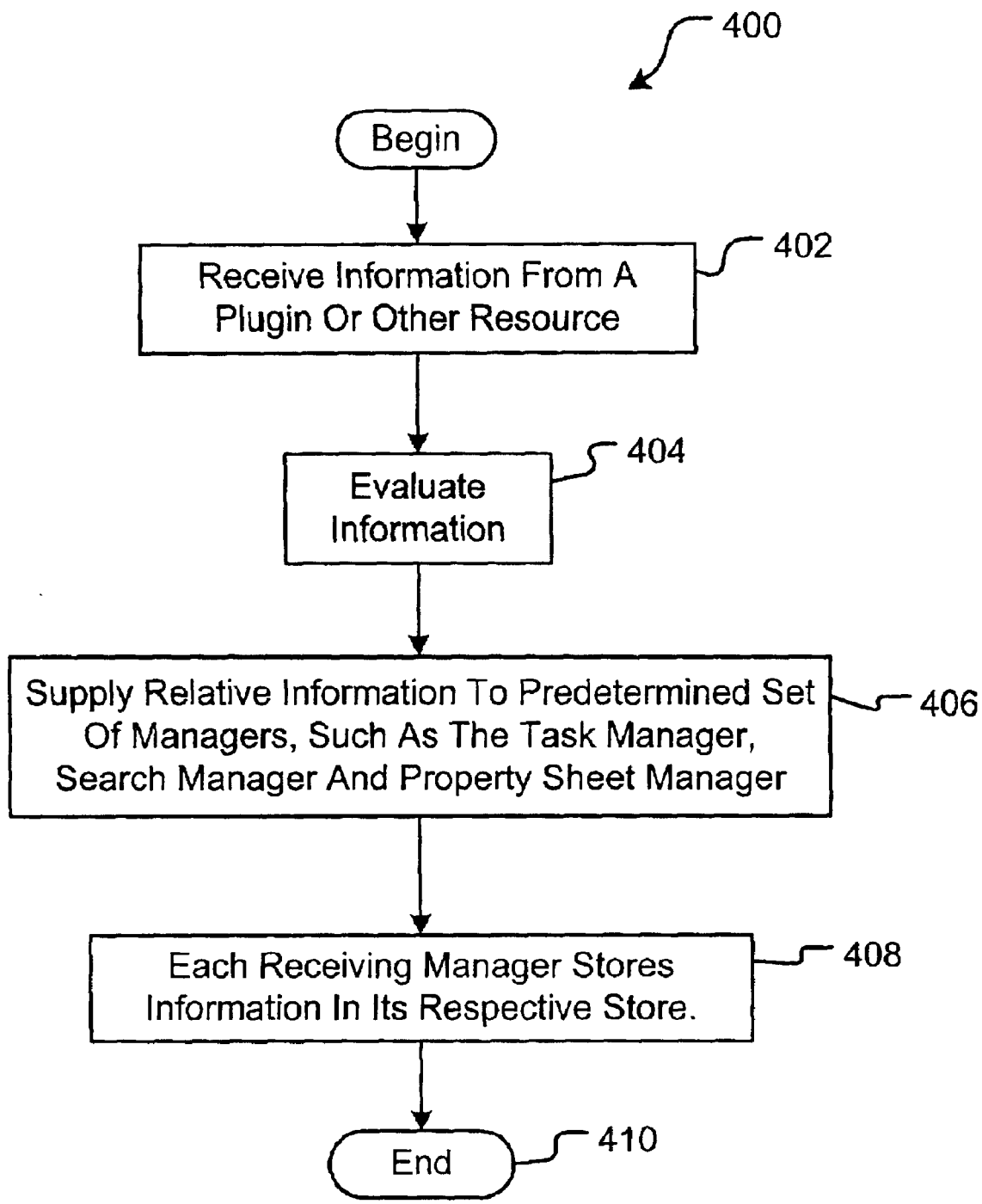
FIG. 4 is a flow diagram showing the operational characteristics performed by the resource management system shown in FIG. 3 in adding a new resource to the system.

Prior to management of a resource, the resource must be installed or registered with or on the system. FIG. 4 illustrates the operational flow characteristics related to the registration of a new resource to the management module 304 shown in FIG. 3. Prior to the start of flow 400, the resource will be created by a developer or some other third party as described above. The purpose of the process 400 relates to the registration of that resource in such a manner as to hook it into the management system 300 and to thereby allow for the various managers described above to access and manage the installed resource. Hence, the resource is to be included in the framework of the system, such as system 300 and will eventually be managed by the management module 304. Furthermore, through the registration process, the installed resource thereafter recognizes a method of communication with the management module 304 and, typically, all communication between the two are performed according to that protocol or method.

Initially, flow 400 begins as receive operation 402 receives a request indicating that a resource or "plugin" is requesting to be installed on the system. Resources that hook themselves into the management module 304 are generally referred to as plugins, where the plugin is the portion of the resource that communicates with the management module by sending and receiving messages. The request may be made by the resource itself or the system may recognize that a new resource is being plugged into the system, thus generating the request. In an embodiment the configuration manager 330 (FIG. 3) receives the request. The request, as well as other provided information, is in a predetermined format, such as in XML, so that the management module

304 understands the configuration information. The request typically includes some predetermined information, such as the name of the resource, the location of various XML files, among others.

In a particular embodiment, the configuration manager 330 is a web service that supports defined methods that any plugin can call into to register, to un-register, and/or to update its install information. In this case, the request from the plugin merely executes one or more of these methods. Also, in this particular embodiment, the information provided by the plugin, relates to the directory where the plugin is installed on the network, such that the system or configuration manager 330 can find more information about the plugin.

Besides installation information, during the initial communication phase 402 between a plugin and the system, the plugin may provide other information relating to the objects, such as objects 329, 331 and 333 (FIG. 3) managed by that plugin. For instance, receive operation 402 may receive information from the plugin relating to the types of objects to be exposed to the system upon completion of the installation process, attributes of those objects, available actions that may be used on those objects, and searchable criteria for those objects. The plugin may further provide information as to other types of objects that are recognized, but not necessarily exposed, by the plugin. Moreover, the plugin may provide available actions that may be accessed that relate to objects managed by another plugin to effectively extend the existing object.

As an example, an Active Directory plugin may exist on the system and it may expose objects relating specific users, known in a preferred embodiment of the invention as user objects. Subsequently, an email application may be installed that recognizes user objects, and specifically provides an email address attribute to existing user objects. Furthermore, the email application may provide available actions to user objects, such as editing email addresses, sending email messages, activating or deactivating an email account, etc. These attributes and actions relating to existing objects are communicated to the configuration manager during receive operation 402. As discussed below, receiving such additional information provides the ability to extend the user object to include the additional information.

Upon receiving information from the plugin, evaluate operation 404 checks the information in the provided directory to ensure that the plugin is installed correctly. In an embodiment, the configuration manager makes sure that the plugin is installed with the correct XML file formats and validates the web service interfaces that the plugins need to expose to the system 304.

Following evaluate operation 404, supply act 406 supplies relevant information to other managers, such as the task manager 328, query or search manager 324, and/or the property sheet manager 332. The act of supplying the information may be performed in a number of ways. For instance, the configuration manager 330 may sort through the various information provided by the plugin and then send the information to each manager that may find a particular piece of information relevant. In such a case, each attribute or property provided by the resource is evaluated to determine if another manager in the system may be interested in the new resource, or some portion thereof. Upon determining that another manager may be interested in information from the new resource, the supply operation 406 effectively notifies the other manager of the information. In another embodiment, the configuration manager 330 may initiate an event that is picked up by other managers, wherein the event indicates that a new plugin has been installed and is requesting registration. Consequently, each manager is responsible for locating and gathering the relevant information.

Once the information has been supplied to the various managers, store operation 408 stores relevant information in local store(s). That is, each manager that receives information related to a newly installed and registered plugin stores some of the information, if relevant, in its local store. For instance, the task manager 328 may evaluate the new information and determine that some task-related information should be stored in the local store corresponding to the task manager. As stated above, each manager may maintain a dedicated store of information for this purpose.

Following store operation 408, the plugin is considered to be installed and registered with the management module such that future management can be controlled through the management module and, therefore, the flow 400 ends at end operation 410.

Although the flow 400 generally relates to adding a new resource to the system, it also relates to extending existing objects within the system. For example, assume the flow 400 is installing an email application to an existing system having an "Active Directory" application that exposes user objects. In this case, since the email application supports user objects, the supply operation 406 essentially supplies new user-object information to managers within the system and the store operation 408 stores the information for later use. The new user object information may include task information, e.g., creating a new email account, editing an email address, activating and deactivating accounts, etc. to the task manager. Similarly, if the email address is a searchable attribute, then this information may be communicated to the search manager 324. Essentially, the user object supported by the Active Directory is now also supported by the email application. More importantly, combining information from separate resources into a single, exposed object, provides a relatively comprehensive set of information about each user, such as all attributes and/or actions by simply accessing the object.

Consequently, the flow 400 relates to the installation of a new resource and the sharing of information between separate modules to provide more comprehensive task handling as well. In the example provided above, assume one of the existing activities for user objects relates to adding a new user, as provided by the Active Directory. Next, assume that the email application was installed according to the flow 400 and that during the supply operation 406, the task manager 328 received supported, user-object tasks, including creating a new account for a new user. The task manager 328 may then recognize that when an "add user" task is executed by the administrator, the system calls both the Active Directory application to add a new user profile and the email application to create a new email account for the new user.

As stated above, in a particular embodiment, the addition of new resources is handled by the configuration manager 330 (shown in FIG. 3), which communicates with resources as they are added to the system. Preferable the resources are installed on the system and then registered with the management module 304. The configuration manager 330 may further configure the resources 306 to allow management of those resources, or at least perform a test operation to make sure the resources are installed in compliance with the necessary minimum requirements to allow other managers to access and manage the resource. For instance, as a new resource is added to the environment 300, configuration manager 330 comprises the software element that communicates with that resource in order to install the resource within the system and evaluate whether the resource is properly installed.

The configuration manager 330 also provides other managers, such as the search manager 324 and the task manager 328, necessary information related to a newly installed and registered resource. Consequently, the various managers can store, within their respective stores, any information related to the new resource so that future communications are possible between the managers and that resource. The new information may relate to the location of the new resource, how to communicate with the new resource, that the new resource should be contacted when a predetermined task is performed, the type of information necessary to perform the task, etc.

As stated, in an embodiment the configuration manager 330 is a web service. Potential web service methods to the configuration manager 330 are provided below in Table 1. The resources 306, as well as other managers, such as the search manager 324 and the task manager 328, may use the methods shown and described in Table 1 to get information about the resources or plugins 306 installed on the system.

TABLE 1

Methods to the Configuration Manager

| Method | Example | Description |
| --- | --- | --- |
| PluginInstalled | String PluginInstalled( string sPath ); Where sPath is the relative path to the plugin to be installed | This method is called by a plugin when it is done installing itself. |
| PluginUnInstalled | String PluginUnInstalled( string sPath ); Where sPath is the relative path to the plugin to be uninstalled | This method is called by a plugin when it is done un-installing itself. |
| PluginUpdated | String PluginUpdated( string sPath ); Where sPath is the relative path to the plugin to be updated | This method is called when a plugin updates its installation. |
| DisablePlugin | String DisablePlugin( string sPath ); Where sPath is the relative path to the plugin to be disabled | This method can be called by the administrator of the management module to Disable a plugin that is registered to the management module. |
| EnablePlugin | String EnablePlugin( string sPath ); Where sPath is the relative path to the plugin to be enabled | This method can be called by the administrator of the management module to Enable a plugin that is registered to the Management Module. |
| DisableAll | String DisableAll(); DisableAll does not require any parameters | This method can be called by the administrator of the Management Module to Disable all plugins. |
| EnableAll | String EnableAll(); EnableAll does not require any parameters | This method can be called by the administrator of the Management Module to Enable all plugins. |

TABLE 1-continued

Methods to the Configuration Manager

| Method | Example | Description |
| --- | --- | --- |
| GetPluginsXML | String GetPluginsXML(); GetPluginsXML does not require any parameters | This method returns all the high level information about plugins, like their name, description and directory install path. |
| GetLocalApplication RootDirectory | String GetLocalApplicationRoot Directory(); GetLocalApplicationRoot Directory does not require any parameters | Plugins can use this method to get information about the Management Module Application directory. |
| GetLocalApplication BinDirectory | String GetLocalApplicationBin Directory(); GetLocalApplicationBin Directory does not require any parameters | Plugins can use this method to get information about the Management Portal Bin directory. |
| String GetLocalApplication PluginDirectory | String GetLocalApplicationPlug inDirectory(); GetLocalApplicationPlug inDirectory does not require any parameters | Plugins can use this method to get information about the Management Portal Plugins Directory |

Using the methods shown and described in Table 1, in combination with flow 400 shown in FIG. 4, plugins can dynamically install, uninstall or update the information they provide to the management module 304. Since the management module 304, in one embodiment, is a web based application, all the new resources only need to be installed in one location and all their information is dynamically picked up by the different managers and translated into an integrated front end for the users.

In a particular embodiment, the information provided to the configuration manager 330 is provided in XML format. Using the XML format, the configuration manager 330 is able to parse the information and understand whether other managers need to be notified of any particular aspect of the XML file. Typically, the resource converts the file to XML format prior to a transmission to the configuration manager 330. Alternatively however, a separate component may be supplied by the system 304 to perform the translation.

The resources 306 manage objects, such as objects 329. Therefore, each resource 306 provides information to the system 304 about its objects, e.g., resource 312 provides information about objects 329. In an embodiment, the resource may provide object information in a property sheet which may be in XML format and which defines a generic object, e.g., such as a generic user object. Additionally, the property sheet may comprise one or more property pages. The property sheet may therefore relate to a combination of property pages. Each property page is defined in an XML formatted portion of code that describes the layout, e.g., where the information is going to be rendered on the user interface, what types of controls are located on the page, etc. Also the XML code for the property page may provide a pointer to a piece of code that populates data regions of the page as well as another pointer that identifies another piece of code that is called to modify the information, e.g., with a set or modify data command.

Figure 5:
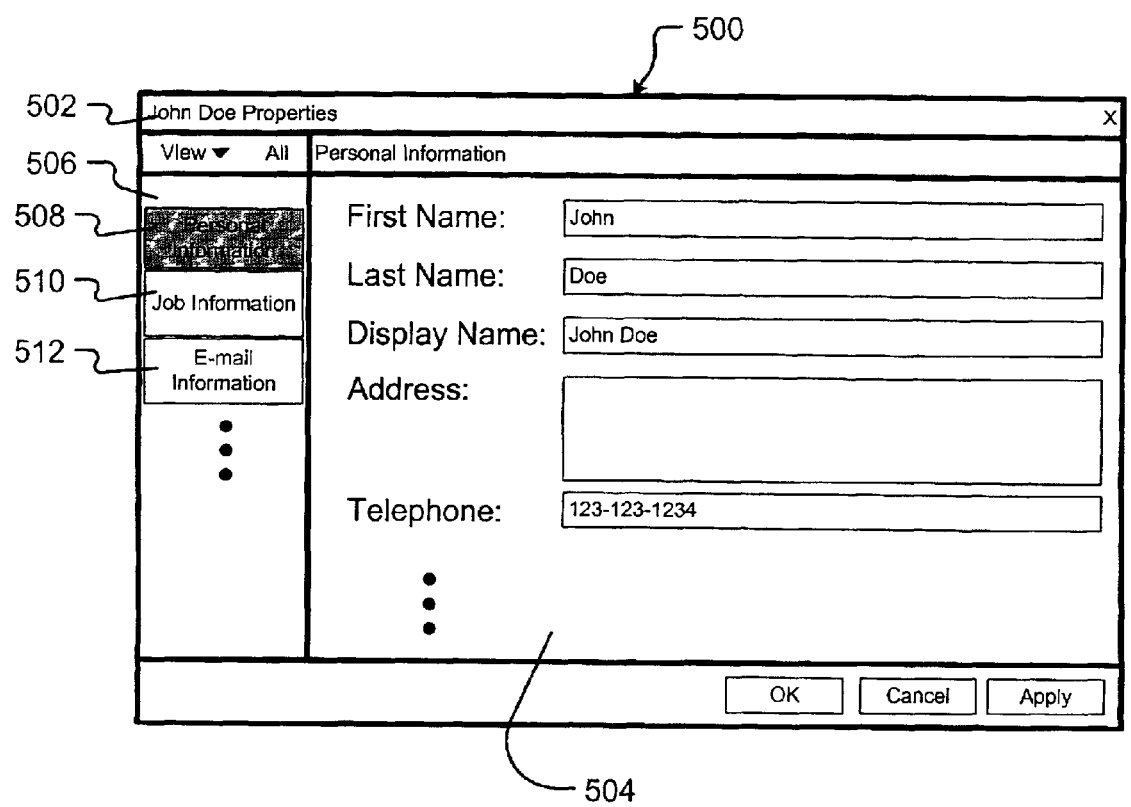
FIG. 5 illustrates an exemplary screen display representing a managed object having a property sheet and the extensibility of the property sheet by way of property pages according to one embodiment of the invention.

With respect to certain aspects of the present invention, the property sheets that are exposed to the system 304 by one resource are extendible by other resources. FIG. 5 illustrates the concept of having a separate, independent application or resource extend an existing property sheet. In FIG. 5, a property sheet representing a particular user object is illustrated in display 500. Consequently, the display 500 represents the object itself. The object provides a title bar 502, an active region 504, and a scope list 506. The title displays the title of an object as defined by the property sheet. The active region 504 displays controls and data fields for one property page, as selected from the list 506. The list 506 lists the various property pages that may be displayed in the active region 504 that relate to the user object 500.

As shown in FIG. 5, the personal information property page control 508 has been selected and therefore the active region 504 displays the property page relating to the personal information for the particular user. Other selection controls for additional property pages are displayed in the scope list 506, such as a job information control 510 and an email information control 512. Additional information about the visual representation of the schema at the client computer system is displayed below with respect to the management console.

Independent resources or applications may define one or more property pages associated with a particular object, such as user object 500 shown in FIG. 5. For example, assume that an Active Directory application exposed the user object 500. Also, assume the Active Directory application defined various property pages, e.g., the personal information page relating to unique personal identification data, such as name, home address, employee number, etc. Additionally, assume another, job-related property page was also defined by the Active Directory application and it included job-related information, such as the person's job title, building location, group, etc. Next, assume that another application is installed on the system, such as an email server. The email server may recognize user objects and supply a property page to be included in the user object property sheet, for instance to associate an email address with the user. Instead of creating a new property sheet, which would include much of the same information, such as the user's name, etc., the email address property page 512 is simply added to the user object property sheet. The information associated with the email address property page includes pointers to code located on the email server relating to available actions for a particular user object relating to email tasks.

As stated above, the property pages may be based on an XML schema, which defines both the types of controls that a property page will contain and the layout of those controls on a page. Table 2 illustrates an example of a Document Type Definition or DTD that defines an XML schema for creating a property page.

TABLE 2

Example DTD for an XML Schema for a Property Page

| | |
|---|---|
| <!ELEMENT propertySheets | (propertySheet+)> |
| <!ELEMENT propertySheet | propertySheetID, name, description, getDataHandler, (setDataHandler,propertyPage+)> |
| <!ELEMENT propertyPage | (propertyPageID, name, description, attributes,layout)> |
| <!ELEMENT attributes | (attribute+)> |
| <!ELEMENT attribute | (attributeID, name, defaultValue?, displayHints?)> |
| <!ELEMENT layout | (row+)> |
| <!ELEMENT row | (item+)> |
| <!ELEMENT item | (attributeID?, displayHints)> |
| <!ELEMENT displayHints | (Type, (Text | Label)?, rows?, cols?, Size?, Show)> |

TABLE 2-continued

Example DTD for an XML Schema for a Property Page

| | |
|---|---|
| <!ELEMENT Label | (#PCDATA)> |
| <!ATTLIST Label | width CDATA "20%" style (left|right|top) "left"> |
| <!ELEMENT Text | (#PCDATA)> |
| <!ELEMENT rows | (#PCDATA)> |
| <!ELEMENT cols | (#PCDATA)> |
| <!ELEMENT propertySheetID | (#PCDATA)> |
| <!ELEMENT propertyPageID | (#PCDATA)> |
| <!ELEMENT attributeID | (#PCDATA)> |
| <!ELEMENT name | (#PCDATA)> |
| <!ELEMENT description | (#PCDATA)> |
| <!ELEMENT getDataHandler | (#PCDATA)> |
| <!ELEMENT setDataHandler | (#PCDATA)> |
| <!ELEMENT defaultValue | (#PCDATA)> |
| <!ELEMENT Type | (#PCDATA)> |
| <!ELEMENT Size | (#PCDATA)> |
| <!ELEMENT Show | (#PCDATA)> |

An example definition of a property page is shown in Table 3. The example shown in Table 3 relates to the schema shown in Table 2 and defines a property page containing a gender data field allowing the user to choose between male or female. The property page depicted in Table 3 also supplies the management module, such as module 304 shown in FIG. 3, with pointers to the code to populate the gender data field and to handle the data once the user has selected a gender. Further, the property page indicates its associated property sheet, i.e., the property sheet that includes the property page.

TABLE 3

Example XML Property Page Definition

```
propertyPage>
    <propertySheetID>
        ActiveDirectory_User_PropertySheet_ID
    </propertySheetID>
    <propertyPageID>
        User_General_PropertyPage_ID
    </propertyPageID>
    <name>
        General
    </name>
    <description>
        Provide the users email details
    </description>
    <order>
        1
    </order>
    <getDataHandler>
        <getDataHandlerID>
            ADUserGetHandler
        </getDataHandlerID>
        <getDataHandlerType>
            Serverside
        </getDataHandlerType>
        <getDataHandlerURL>
            ActiveDirectoryPlugin/user.asp
        </getDataHandlerURL>
    </getDataHandler>
    <setDataHandler>
        <setDataHandlerID>
            ADUserSetHandler
        </setDataHandlerID>
        <setDataHandlerType>
            Serverside
        </setDataHandlerType>
        <setDataHandlerURL>
            ActiveDirectoryPlugin/user.asp
        </setDataHandlerURL>
```

TABLE 3-continued

Example XML Property Page Definition

```
        </setDataHandler>
        <attributes>
            <attribute>
                <attributeID>
                    UserID
                </attributeID>
                <name>
                    Gender
                </name>
                <type>
                    <typeID>
                        enum
                    </typeID>
                    <typeData>
                        <DataValue>Male</DataValue>
                        <DataValue>Famale</DataValue>
                    </typeData>
                </type>
                <defaultValue/>
            </attribute>
        <attributes/>
</propertyPage>
```

In order for a resource to expose property sheet functionality, one embodiment of the invention suggests that the resource implement an interface, such as IPluginPropertySheet which may be accessed by the management module 304. In particular, a property sheet manager 332 may be implemented as part of the module 304 to communicate with resources that have exposed property sheet functionality. The interface IPluginPropertySheet provides a resource or plugin with a property sheet handler: an interface that may be called by the property sheet manager 332 to get or set property sheet information. Alternative embodiments may utilize other communication methods in order to provide management capabilities over the property sheets.

The IPluginPropertySheet object defines the methods show and described below in Table 4.

TABLE 4

Methods Implemented by Resource Property Sheet Interface

| Method | Example | Description |
| --- | --- | --- |
| GetData | Properties GetData( string strID string strObjectInstance ID); Where: strID is the identifier for the property sheet and strObjectInstanceID is the instance identifier for the object whose data is used by the property page. | Retrieves data from the property sheet. A "Properties" object containing the properties for the object identified by strObjectInstanceID is returned by the given example. |
| GetDataForCondition | Properties GetDataForCondition(ConditionData conditiondata); Where conditiondata defines the condition that the properties will be based on. | This method returns the plugin's data for a property sheet, based on a condition, in "Properties" object. |
| GetPageInitData | Properties GetPageInitData(PageInitData pageinitdata); Where pageinitdata is the data used to initialize the property page. | Retrieves initial data for the property sheet, i.e., initializes the data for a property page, in "Properties" object. |

TABLE 4-continued

Methods Implemented by Resource Property Sheet Interface

| Method | Example | Description |
| --- | --- | --- |
| SetData | Task SetData( Properties psData); Where psData is the property sheet data values that have changed. | Sets data in the property sheet. Task is a an object that should be run on a client system. |

Using the methods shown in Table 4, the management module 304, and in particular, a property sheet manager, may get data from a plugin or resource and modify data that is stored in the resource with respect to property pages.

Figure 6:
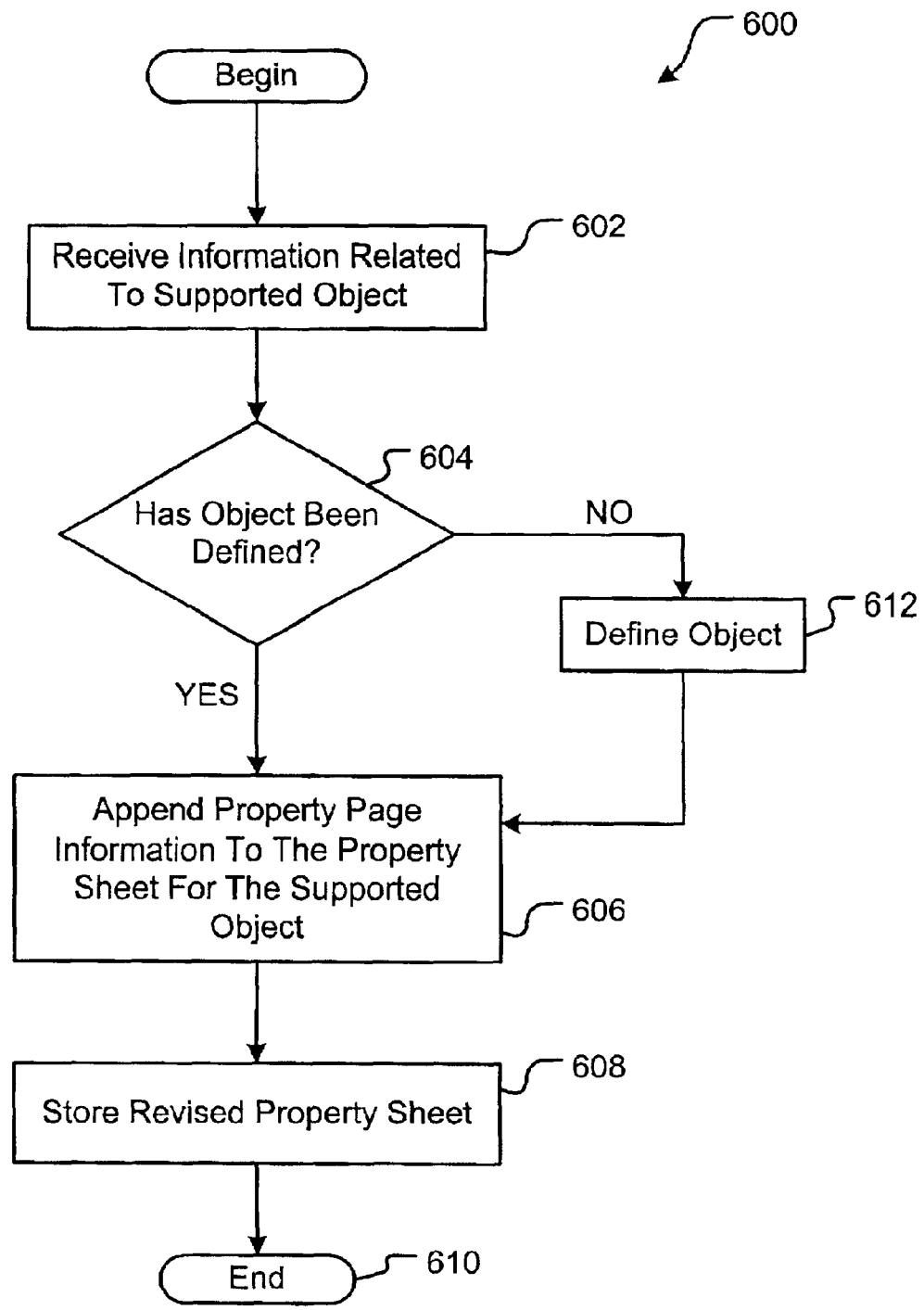
FIG. 6 is a flow diagram illustrating the operational flow characteristics performed by the resource management system in extending an existing property sheet according to one embodiment of the invention.

FIG. 6 illustrates the functional components or operational flow characteristics related to the extension of an existing property sheet by another, separate resource. That is, when a resource is initially installed, the resource supplies information to the configuration manager 330, shown in FIG. 3. FIG. 6 illustrates an exemplary flow of operations during one such installation procedure, and in particular to the communication between the resource and the property page manager 332, shown in FIG. 3. Additionally, the procedure shown in FIG. 6 relates to particular operations that may occur during operations 406 and 408 described above in conjunction with FIG. 4, where new object information is supplied to other managers within the management module 304 and then stored by those managers.

The flow 600 begins as receive operation 602 receives information related to a supported object. In one embodiment, receive operation relates to the property sheet manager 332 receiving a property page and an indication of the parent object, i.e., property sheet for that property page. Upon receiving the property page, a determine operation 604 determines whether the parent object, i.e., property sheet for that property page has already been defined by another resource. If so, the flow branches YES to append an operation 606.

The append operation 606 appends the received property page to the property sheet. Essentially, the property sheet definition is modified, such as by the property page manager to include a pointer to the new property page. Thus, the next time the property sheet is called, the new property page information is displayed along with other property pages for the supported object.

Following the append operation 606, a store operation 608 stores the revised property sheet information, such as in a property sheet datastore, e.g., store 344 shown in FIG. 3. Once the information is stored, flow ends at an end operation 610. If, however, the determine operation 604 determines that the object has not been defined, then the flow 600 branches NO to a define object operation 612, which defines the property sheet for the system. Once the object has been defined, the flow 600 continues to the append operation 606, which adds the received property page to the newly defined property sheet. As discussed above, the property sheet may be modified to include a pointer to the new property page. As before, once the property sheet is modified, the information is stored at the store operation 608, and the flow 600 ends at an end operation 610.

The ability to extend an existing property sheet by other, independent resources provides the management module 304 with an effective means of displaying and launching functions based on an object-centric approach. That is, an object, such as a user object, may be located by the management module 304 and displayed. The displayed object may include property pages supplied by more than one resource. Thus, the display is based on the user object and not based on the many and various resources that may or may not support the user object. In other words, displaying an object may display all the information about that object, even if some of the information is supplied by different resources.

Figure 7:
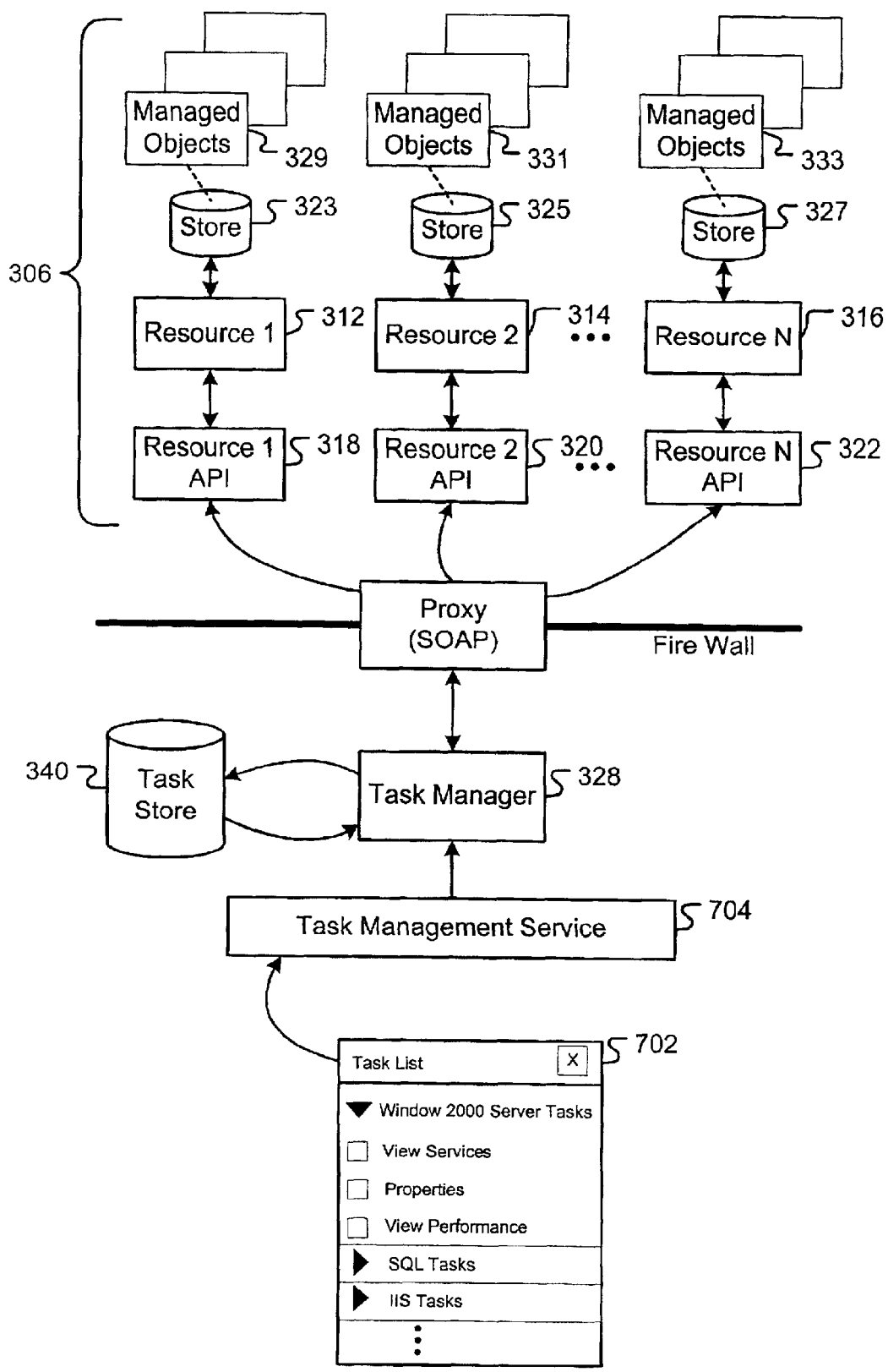
FIG. 7 illustrates a software environment for performing a multi-step task in an embodiment of the invention.

Besides providing an object-centric approach to displaying information, the environment 300 (FIG. 3) may also display and launch functions based on a task-based approach, wherein a combination of management functions across multiple resources are combined into a single task. FIG. 7 illustrates the task manager in an embodiment of the invention and the display of a task list according to this embodiment. That is, the environment 300 displays many functions that may be performed on a particular object, even if those functions may require the use of different resources, such as resources 306 (FIGS. 3 and 7). Yet in an alternative embodiment, groups of functions may be combined into a script to perform multiple functions across multiple resources relating a particular task, e.g., a task that an administrator performs in their job function. FIG. 7 illustrates a software environment used in displaying and executing tasks or groups of tasks in an environment, such as environment 300 (FIG. 3). As will be noted, some of the components in FIG. 7 also appear in FIG. 3 and therefore like reference numerals remain consistent between the figures.

Tasks or task groups may be displayed on user interface control 702 by a task management service module 704. A further description of a GUI suitable for the user interface control 702, or task list, is described below with respect to the management console. In a particular embodiment, the user of the system may search for tasks using either quick search or advanced search techniques, as described below. Searching for the tasks causes the task manager 328 and task management service 704 to return a list of tasks that match or are related to the task that was requested. Alternatively, the user may browse a list of available tasks with the control of the task manager 328. In an embodiment, browsing may be performed by scrolling through a hierarchical list of tasks based on the application or resource associated with the task or based on which object is associated with the task.

In a particular embodiment, the task list 702 displays a list of tasks associated with a given instance or object. These tasks can be provided by the framework in response to a query and subsequent generation of a "results list" described below. Thus, the framework provides the end user with tasks that are appropriate based on the environment and state of the data object when the user locates and/or selects such an object. The task list can also be segmented into task groups. Groups can be predefined by the application or redefined by the administrator.

Once the set of tasks has been discovered by the user and displayed in the task list 702, the list 702 provides a launch point for the tasks. That is, a user may provide an indication to execute a task from the user interface. Once indicated, the task management service 704 receives the task request. In turn, the task manager 328 may begin to carry out the task. The task manager 328 may need to reference the task request with information in the task store 340 to locate which resources need to be accessed and which parameters need to be passed to those resources.

Upon determining which resources must be accessed, task manager 328 communicates with those resources, such as resources 318, 320 and 322 through a SOAP proxy and a firewall, as shown in FIG. 7. SOAP is an XML-based protocol that is designed to exchange structured and typed information on the Web. The purpose of SOAP is to enable rich and automated Web services based on a shared and open Web infrastructure. SOAP can be used in combination with a variety of existing Internet protocols and formats including HTTP, SMTP, and MIME and can support a wide range of applications from messaging systems to RPC. Alternatively, other proxy communications may be used to provide the communication protocol. The resources are therefore called by the task manager and provided information to carry out specific tasks. Importantly, more than one resource may be called in response to a single task request from the user. The method of combining multiple functions into a single task may be customized by the user as described below with respect to scripting.

In displaying the tasks, different display methods may be implemented. In a particular embodiment of the present invention, an XML definition of tasks, task groups and the handlers for those tasks is used. An example XML definition of tasks, task groups and the handlers for those tasks is provided below in Table 5. In this case, the "Manage Computers" task groups will, when rendered, contain a "Properties" and a "Terminal Server" task.

TABLE 5

Sample XML File for Generating and Displaying a Task List

```
<tasks>
    <static>
        <taskgroup>
            <id>1</id>
            <name>Manage Computers</name>
            <task>
                <name>Properties</name>
                <description>Change the properties</description>
                <id>2</id>
                <icon>images/ThirdPaneIndicator_Icon.gif</icon>
                <handler><![CDATA[alert ('Not implemented');]]>
                </handler>
            </task>
            <task>
                <name>Terminal Server</name>
                <description>Launch terminal server</description>
                <id>3</id>
                <icon>images/ThirdPaneIndicator_Icon.gif</icon>
                <handler><
                    // task handler script here
                </handler>
            </task>
        </taskgroup>
    </static>
</tasks>
```

Figure 8:
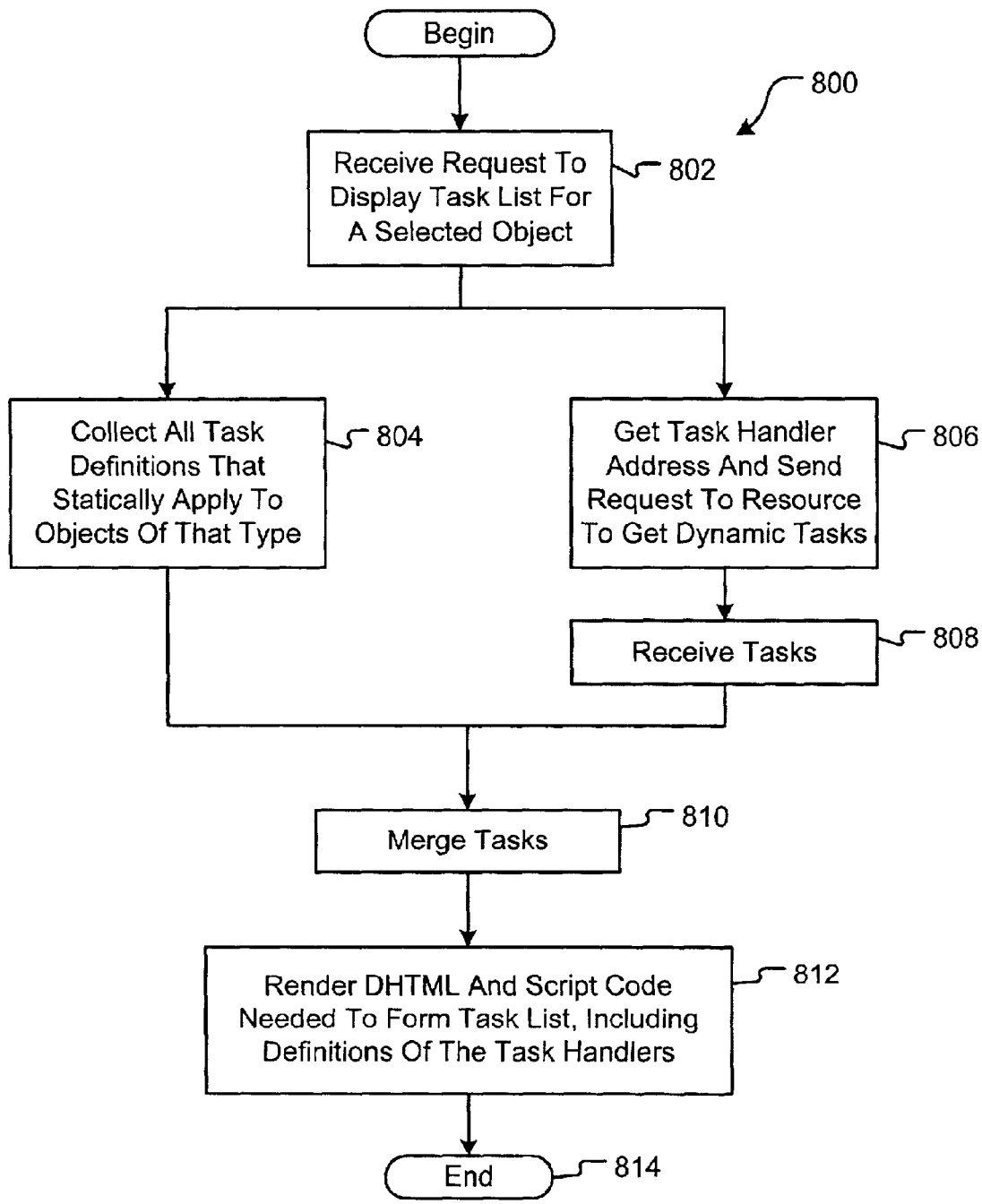
FIG. 8 is a flow diagram showing the operational characteristics performed by the resource management system and the task manager, shown in FIG. 3 in displaying a task list in an embodiment of the invention.

Using an XML file similar to the one shown in Table 5, a task list, such as task list 702 shown in FIG. 7, may be generated and displayed for the user upon selection of a data object or upon some other function, such as a request to display possible tasks that may be performed for a particular resource. FIG. 8 illustrates the functional components or operational flow characteristics related to the generation and display of such a task list. In particular, the flow 800 illustrated in FIG. 8 relates to the generation and display of a task list related to particular tasks that may be performed for a given object type that, for example may have been selected by the user. Therefore, in this embodiment, as a task list is being rendered for display in the user interface, the list is associated with the one or more objects that the tasks would ultimately apply. In a particular embodiment, the task manager 328 (FIG. 3) provides the functions shown and described in conjunction with FIG. 8. In alternative embodiments, other managers may be used to provide some or all of the functions shown and described in FIG. 8.

Initially, the flow 800 begins as a receive operation 802 receives a request to display a task list for a selected object. That is, prior to receive operation, a user or the system selects an object and conducts a request indicating that the associated tasks for that object should be collected and displayed. For example, an administrator may highlight a particular user object. Highlighting or otherwise selecting the user object may, in one embodiment, automatically causes a request to be made for the tasks associated with that object. The request to collect and display all the tasks for the object typically includes the object type and the information about the instance or context of the object.

Upon receiving the request, a collect operation 804 collects all the definitions that statically apply to the particular object type. Static tasks are defined as those tasks which may also be performed on a particular object. In one embodiment, when a task is created by a resource and associated with an object the resource may designate the task as a static task and that task may always be performed on any object of that object type. For instance, for a user object having user information, static tasks may relate to editing the user information and/or deleting the object. Since these tasks are static, the collect operation 804 may locate the tasks in a local store of information, such as store 340 shown in FIG. 3, or by requesting the tasks from the resource that supports the task.

While the collect operation 804 is collecting static task definitions, a get operation 806 gets the task handler address for the particular object type. The task handler address may be found in the definition of the object and/or property page itself. The address indicates a particular resource that may have dynamic tasks that are to be displayed. Using the task handler address, a request is generated and sent to the identified resource to collect all dynamic tasks. Dynamic task information relates to functions that may be performed on particular data object, e.g., a particular user, but may not be available for all objects of that type, e.g., all users. Additionally, dynamic tasks may relate to the particular instance of an object, e.g., a task relating to disabling an account is dynamic since it depends on whether the account has been enabled.

Following the request for dynamic tasks at operation 806, a receive operation 808 receives the dynamic tasks from the indicated resource. Once the static and dynamic functions have been collected and located, a merge operation 810 merges the task information. Upon merging the information, a render operation 812 renders the list information to the user in the form of task list 702 (FIG. 7). In an embodiment, render operation 812 renders DHTML code needed to display the task list. Additionally, render operation 812 renders definitions of the task handlers which are associated with the various tasks displayed in the list 702 and which may be called upon selection of one of the displayed tasks.

In accordance with other aspects of the present invention, the task manager 328 may also provide the ability to group functions or tasks that may be performed across multiple resources. In one embodiment, the grouping of functions are implemented as "scripts" and actions taken within the user interface trigger these scripts, thereby passing various parameters. The parameters may be provided explicitly by the user or the parameters may be extrapolated, by the framework from the context of the user interface when a particular script is invoked. Having all functions imple- mented as scripts increases the manageability of objects. Scripts may run on a local server or be pushed to the managed resources and executed on the resource. Additionally, scripts can be amalgamated in process to support customization for the end user. Extensibility of functions relates to the extending application simply adding a new script to the library of the original application or resource.

In an embodiment, the scripts for all applications are stored in a central script library and are referenced by a script identification value. An end user may invoke a script by referencing the script using the identification value while passing in a set of parameters. Alternatively, a query may be passed in place of the parameter list, which causes the script to be executed on all objects that satisfy the query parameter.

Figure 9:
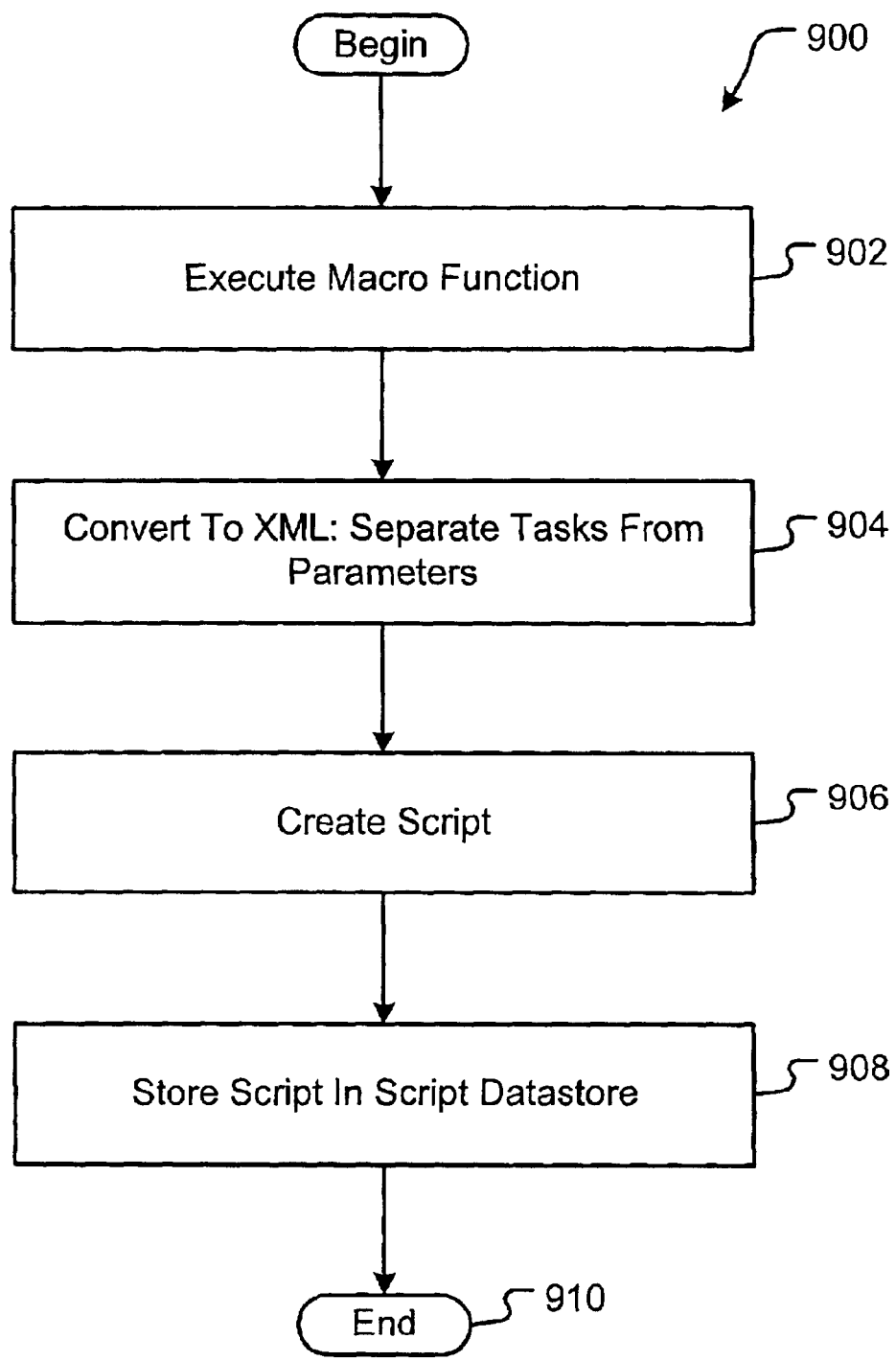
FIG. 9 is a flow diagram showing the operational characteristics performed by the resource management system in creating a script in accordance with aspects of the present invention.

FIG. 9 illustrates the functional components or operational flow 900 characteristics related to the creation of script having two or more functions associated with the script. Initially, an execute operation 902 executes the macro function, which records two or more user functions or operations into a macro format. The macro operation and function is similar to other macro recording operations. The macro effectively contains both tasks and parameters relating to the actual, recorded, user-interface functions.

Following the execute operation 902, a convert operation 904 converts the macro into an XML format file. The conversion necessarily separates the actual tasks from the parameters used in performing each task. Next, using the XML file, a create operation 906 creates a script from the XMIL file. Creating the script involves storing the task information independent from the parameters. Some indication may be stored along with the task information within the script that prompts the user to supply one or more needed parameters. Alternatively, the indication may refer to the store to determine the information from the context that the script was executed, or to locate supplied parameters from a query list.

Upon creating the script, a store operation 908 stores the script in the script datastore. The user may call the script at a later time to execute the plurality of functions. Alternatively, the script may be executed automatically in response to a predetermined event or as a periodically timed task.

To illustrate the scripting functionality, consider the following example. Assume that a human resources specialist is charged with creating a new user profile within the company. The specialist may record a macro of all the separate tasks that must be performed in order to create a new user profile. Those tasks may include notifying the accounting department to inform them that they need to address payroll information for the user and notifying the corporate security department indicating that a new key card should be made. Similarly, other relevant departments may be notified. A script of all these functions and notifications is created and stored in a script store so that the next time a new user profile must be generated; only the script needs to be called. In this case, the script prompts the specialist for user information to complete the profile and then the script notifies accounting, corporate security, etc. Consequently, the specialist does not have to perform repetitive steps in creating a new user profile for each new user.

With respect to other aspects of the present invention, the management module 304 provides search capabilities. The environment 300 and the management module 304 includes a search or query manager 324 that is used to carry out various searches, such as searches for objects types, particular objects, resources, tasks, groups of tasks, among others. The search manager 324 interacts with the user interface manager 326 to receive queries and, in turn interacts with resources 312, 314 and 316 to locate requested items based on the given query.

In an embodiment of the invention, the manager 324 uses a schema driven search method which greatly enhances the flexibility of traditional searching capabilities by allowing the search parameters to be fully configurable through XML schema by the resources themselves. In essence, a resource may choose what object attributes can be searched over and in what domains the search is to be performed while still maintaining the uniformity of the user-interface and the architectural interface across different renderings of the management module 304.

More particularly, in an embodiment the plugin may provide such information to the configuration manager at process step 402 described above in conjunction with FIG. 4. The plugin provides the configuration manager 330 with a list of all attributes that define their objects and also a list of which of these attributes that may be used in subsequent searches. Additionally, the plugin may indicate the available scopes for such searches. The search manager 324 is then provided this information at supply operation 406.

Based on the information provided by the plugin, the management module 304 can generate the appropriate user-interface, as well as pass the schema to other resources to ensure an appropriate search is performed and the correct search results are displayed. In this embodiment, the environment does not have to specify all attribute names that are searchable for all possible object types. Instead, the plugin provides this information.

Figure 10:
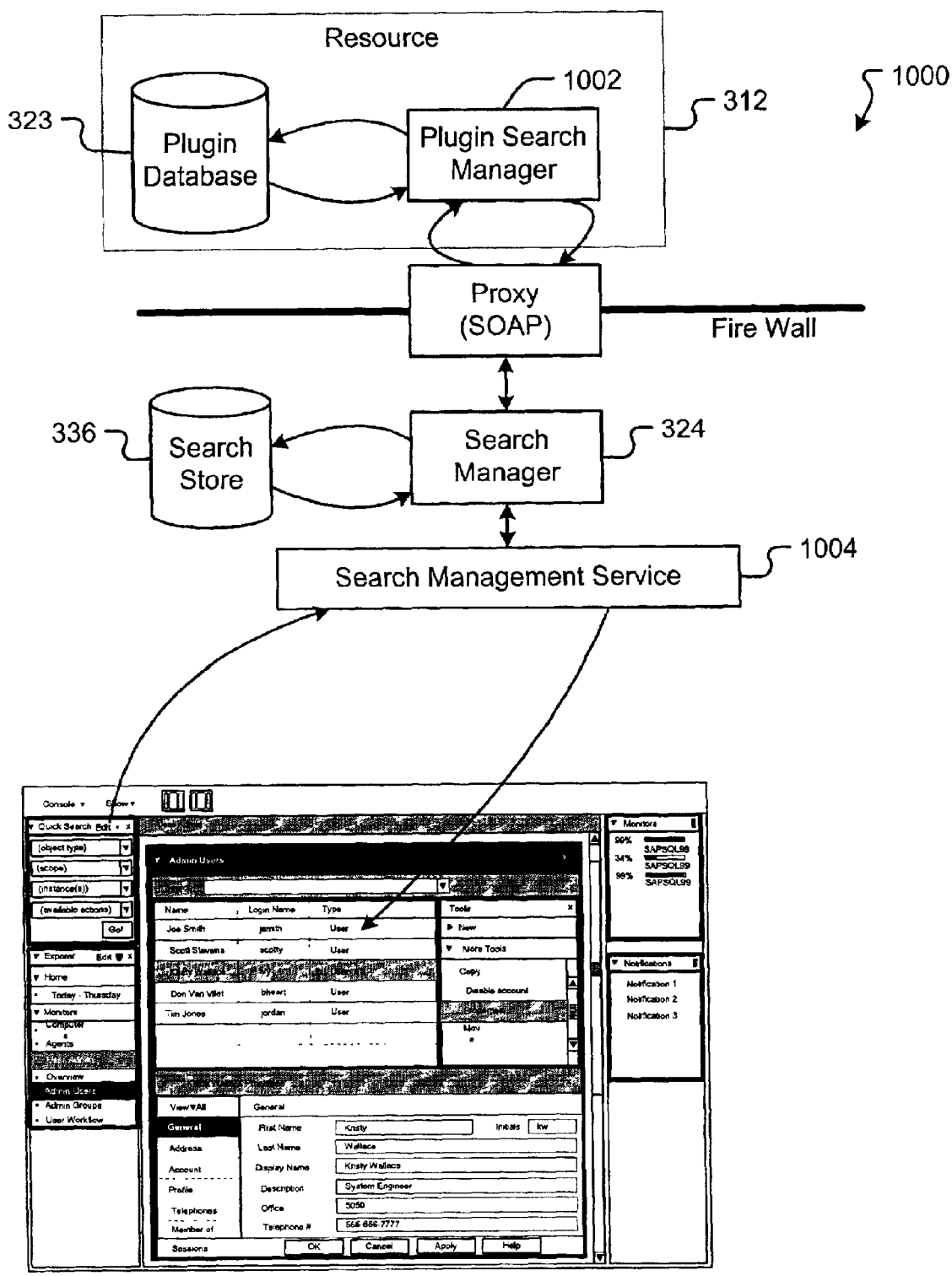
FIG. 10 illustrates a software environment for performing a search in an embodiment of the invention.

Additionally, as shown in FIG. 10, the plugin may incorporate its own search engine 1002. An embodiment of the present invention provides the plugin the capability of specifying its own search engine 1002 and hooking it into the management environment 304 and search manager 324. Therefore, when a user performs a search for a particular object type the management module 304 passes the search string to the tailored search engine 1002 and retrieves the correct results from that search engine 1002. In this manner, the end user experiences similar search characteristics independent of the object being located or the location of the object. Moreover, a standard method of searching need not be written in the management module 304, e.g., a method that would account for the search syntax and architectural backend for supporting any and all searches over any object types. Instead, the separate search engines, such as engine 1002, are hooked into the management module 304 and called via a predetermined protocol.

In an embodiment, the protocol relates to use of an XML schema that conforms to the following Document Type Definition (the rules of the schema) shown in Table 6. The DTD shown in Table 4 provides the schema for defining an object type, which includes the schema to define the objects search parameters.

TABLE 6

Object Type XML DTD

| | |
|---|---|
| <!ELEMENT objectTypes | (objectType+)> |
| <!ELEMENT objectType | (id, domain?, name, imageURL, quickSearchHandlerURL, quickSearchHandlerType, advancedSearchHandler, advancedSearchUI, adInfo?,attributes, tasks)> |

TABLE 6-continued

Object Type XML DTD

| | |
|---|---|
| <!ELEMENT attributes | (attribute+)> |
| <!ELEMENT attribute | (((isScope, scopeHandlerURL, scopeHandlerType) \| (isInstanceID?,id, name, isQuickSearchable?, dataType, advancedQueryDisplayHints, resultsDisplayHints)))> |
| <!ELEMENT advancedQueryDisplayHints | (show, requiredValue, defaultValue, order, width)> |
| <!ELEMENT resultsDisplayHints | (show, order, width)> |
| <!ELEMENT tasks | (static?,dynamic?)> |
| <!ELEMENT static | (taskgroup)> |
| <!ELEMENT taskgroup | (id, name, task+)> |
| <!ELEMENT task | (name, description, id, icon, handler)> |
| <!ELEMENT handler | (#PCDATA)> |
| <!ELEMENT dynamic | (publishers)> |
| <!ELEMENT publishers | (publisher+)> |
| <!ELEMENT adInfo | (objectCategory, objectClass)> |
| <!ELEMENT publisher | (#PCDATA)> |
| <!ELEMENT objectCategory | (#PCDATA)> |
| <!ELEMENT objectClass | (#PCDATA)> |
| <!ELEMENT description | (#PCDATA)> |
| <!ELEMENT icon | (#PCDATA)> |
| <!ELEMENT show | (#PCDATA)> |
| <!ELEMENT requiredValue | (#PCDATA)> |
| <!ELEMENT defaultValue | (#PCDATA)> |
| <!ELEMENT order | (#PCDATA)> |
| <!ELEMENT width | (#PCDATA)> |
| <!ELEMENT scopeHandlerURL | (#PCDATA)> |
| <!ELEMENT scopeHandlerType | (#PCDATA)> |
| <!ELEMENT isInstanceID | (#PCDATA)> |
| <!ELEMENT isQuickSearchable | (#PCDATA)> |
| <!ELEMENT dataType | (#PCDATA)> |
| <!ELEMENT isScope | (#PCDATA)> |
| <!ELEMENT id | (#PCDATA)> |
| <!ELEMENT domain | (#PCDATA)> |
| <!ELEMENT name | (#PCDATA)> |
| <!ELEMENT imageURL | (#PCDATA)> |
| <!ELEMENT quickSearchHandlerURL | (#PCDATA)> |
| <!ELEMENT quickSearchHandlerType | (#PCDATA)> |
| <!ELEMENT advancedSearchHandler | (#PCDATA)> |
| <!ELEMENT advancedSearchHandlerUI | (#PCDATA)> |

An example XML schema to define a search is shown in Table 7.

TABLE 7

Sample XML Schema to Define a Search

```
<OBJECTTYPE>
    <ID>4D36E96A-E325-11CE-BFC1-08002BE10318 </ID>
    <NAME> Computer </NAME>
    <QUICKSEARCHHANDLER>
        http://MMP/Search/ADS_Search.ASP
    </QUICKSEARCHHANDLER>
    <ADVANCEDSEARCHHANDLER>
    </ADVANCEDSEARCHHANDLER>
    <ATTRIBUTES>
        <ATTRIBUTE>
            <ISQUICKSEARCHABLE>
                True
            </ISQUICKSEARCHABLE>
            <ISDEFAULT> True </ISDEFAULT>
            <ID> OF-40-5012 </ID>
            <NAME> Office </NAME>
            <DATATYPE> String </DATATYPE>
            <ADVANCEDQUERYDISPLAYHINTS>
```

TABLE 7-continued

Sample XML Schema to Define a Search

```
            </ADVANCEDQUERYDISPLAYHINTS>
            <RESULTSDISPLAYHINTS>
                <SHOW>
                </SHOW>
                <ORDER>
                </ORDER>
                <WIDTH>
                </WIDTH>
            </RESULTSDISPLAYHINTS>
        </ATTRIBUTES>
</OBJECTTYPE>
```

The above example defines part of an object having an attribute named "Office" that is to be exposed to the search system. That is, when an end user of the management system 304 wishes to search for an object of this type they can do so using the office attribute.

In another embodiment, the line "http://MMP/Search/ADS_Search.ASP" is replaced with "http://MMP/Search/ADS_Search.asmx" such that the example defines part of an object including a pointer to the search engine that is to be used to search for objects of the above type. In this case the pointer is now http://MMP/Search/ADS_Search.

In a particular embodiment, the search manager 324 may provide two options to the user, a quick search and an advanced search. With respect to the advanced search function, the user may supply an advance-search query to the search manager 324, which, in turn, parses the query. Based on the results of the parsing action, the search manager may then access the various resources and subsequently search information stored in conjunction with those resources to locate the requested information. Many different advanced search algorithms may be implemented to perform the search function. The search manager 324, however, controls the searches performed, either using plugin search engines, such as engine 1002 or a search engine located on the resource management module 304, not shown. Results from searches may be marshaled back to the user through a search management service 1004 and displayed in the user interface 1006, as described below.

Figure 11:
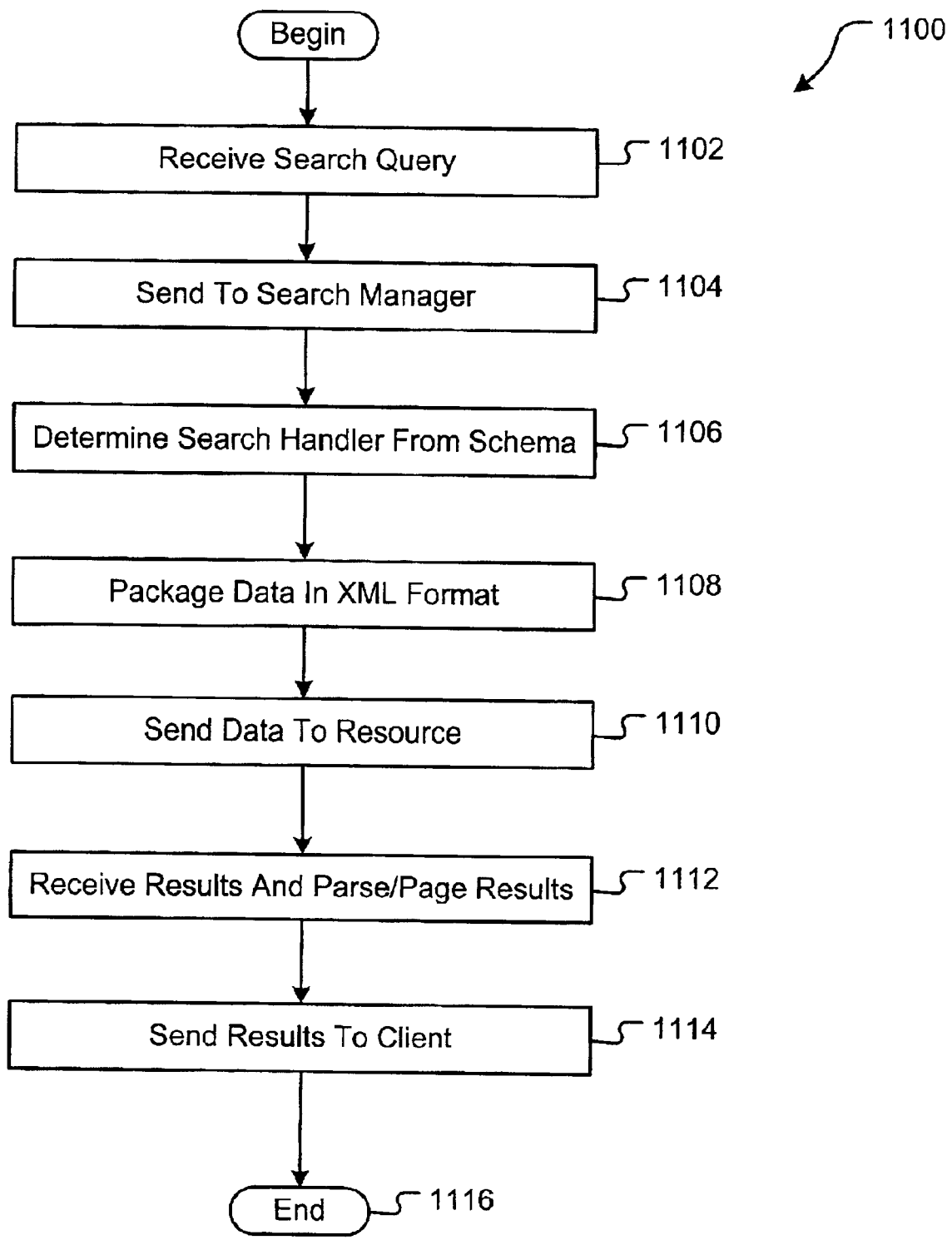
FIG. 11 is a flow diagram showing the operational characteristics performed by the resource management system and the search manager, shown in FIG. 3 in executing a search in an embodiment of the invention.

FIG. 11 illustrates an operational flow 1100 related to the execution of a search function. Initially, a receive operation 1102 receives a search query. The query may be received from the client system 308. However, in other embodiments, the system 304 may receive the query from other sources, such as one of the managers, e.g., the task manager 328 or one of the resources 306. The query includes information related to the types of objects or tasks that are requested. However, in other embodiments, the query may include any information that can be used to conduct a search either locally on the management module 304, or on one or more resources 306.

Upon receiving the query, a send operation 1104 sends the query to the search manager 324 (FIG. 3). The search manager 324 may then parse the search request and associated query. In an embodiment, the request is formatted in an XML format and includes a tag identifying a search handler. Next, a determine operation 1106 determines the search handler from the received query. The search handler is identified by an address or pointer located in the query or within a property sheet which may be determined based on the query terms.

Following determine operation 1106, a package operation 1108 packages the data into an XML formatted file. The query may include attributes that can be passed to a resource. However, prior to passing to the resource, the information is first put into a recognized format, e.g., XML. Once packaged, a send operation 1110 sends the information or data to the resource. The resource that receives the information relates to the resource that manages the search handler. The resource then performs a search amongst its managed objects to locate the requested information.

Following the send operation 1110, and once the resource has located the requested information, a receive operation 1112 receives the results from the resource. The received information may be formatted into an XML format. Additionally, any parsing of the results may be done by the receive operation 1112. Furthermore, should the results contain multiple pages of information, the receive operation 1112 may also page the results into memory. Next, a send operation 1114 sends the results of the query to the client. As stated, the results may contain a significant amount information and therefore the results may be divided into pages for the client.

The method shown and described in conjunction with FIG. 11 may be used for either the advanced search or the quick search feature. However, the advanced search option provides a layer of processing that may evaluate query strings and access multiple resources, such that the scope of the search may be quite broad. Indeed, the searches may be general in nature and the results may comprise a plurality of objects. In such a case, those objects may reside on different resources.

On the other hand, the quick search feature is intended to compliment the advanced search feature by providing the plugin with a way to expose their most frequently sought data to the user through a simple, easy to use search interface. In an embodiment, the quick search feature is a subset of the advanced search, i.e. it's queries feed into the advanced search algorithm. Alternatively, the quick search operates independently of the advanced search algorithm. Further particulars related to the quick search features are discussed in detail below with respect to the management console GUI.

As described, the systems and methods of the present invention allow for the management or administration of a number of varied resources in a computer network. As will now be described in greater detail, the management or administration of the varied resources may be carried out via a unique graphical user interface displayed on a client computer system, such as the client computer system 302 shown in FIG. 3. As will now be described, in an embodiment of the present invention, a unique "management console" running in a web browser application on a client computer system provides a consistent interface for a variety of "back-end" resources, such that the system administrator may perform his or her network administration tasks in a clear and concise manner from any number of computing device having accesses to the internet.

As described above, the user interface manager 326, of the management module 304, provides appropriate communication links and protocols between the client computer system 302 and the management module 304 in a manner that allows a browser, such as the web browser 116 on the client computer system 116, to provide remote resource management capabilities to a system administrator. In one embodiment, the interface manager 326 includes a web service. As is known, a web service is a unit of application logic providing data and services to other applications, such as the web browser 116 running on the client computer system 102.

As also described above an application, such as the browser 116, may access the web service of the interface manager 326 using web protocols and data formats, such as HTTP, XML, and SOAP. During an initial access of the interface manager 326 by the browser 116, the interface manager 326 downloads a small application, herein referred to as the console applet 313, to the web browser 311, as shown in FIG. 3. The console applet 313 may comprise, for example and without limitation, a Java applet. The console applet 313 operates within the browser to render a management console, within the browser, in accordance with predefined console layout specifications and features. As also described below, the console 313 applet also manages the sending and receiving of information to and from the interface manager 326.

In one embodiment of the present invention, the layout of a format of the particular management console being rendered in the browser 311 on the client computer system 116 is specified by an XML document sent from the interface manager 326 to the console applet 313. In this embodiment, the console applet then opens the XML file by loading the XML file into an XML Document Object Model (DOM) object. The DOM object is then used to access the data defining the format of the consol. The console applet 313 then interprets the data and generates appropriate HTML, DHTML, or scripts (such as java script or jscript) for rendering the management consol in the browser 311.

Additionally, data relating to requests or inquiries from the client environment 302 to the management module 304, or responses from the management module 304 to the client environment 302, may also be formatted and transferred between the client environment 302 and the management module 304 as XML documents. Once the interface manager 326 has received a request or inquiry from the client environment 302, the interface manager functions to distribute the request or inquiry to the appropriate manager or resource.

The format of the XML documents sent between the console applet 313 and the interface manager 316 are predetermined. In one embodiment, the format of any XML document sent between the interface manager 326 and the console applet 313 is specific to the particular manager that will ultimately access or handle the data contained in the XML document. For example, as described above, information or requests that are to be handled by the search manager may be transmitted in an XML document that has a format that is uniquely configured for search specific data and commands.

As shown in FIG. 3, the client environment 302 may include a web browser 311, such as browser 116 shown in FIG. 1, as well as an applet 313 running on the web browser 311. The applet 313 functions to generate a management console, as described below, in the web browser 311. The web browser 311 may be any standard web browser that is compatible with the Microsoft ".NET Framework."

As is known, a web browser is a client application, software component, or operating system utility that communicates with server computers via standardized protocols such as HTTP, FTP and Gopher. Web browsers receive documents from the computer network and present them to a user. Microsoft Internet Explorer, available from Microsoft Corporation, of Redmond, Wash., is one example of a web browser.

Figure 12:
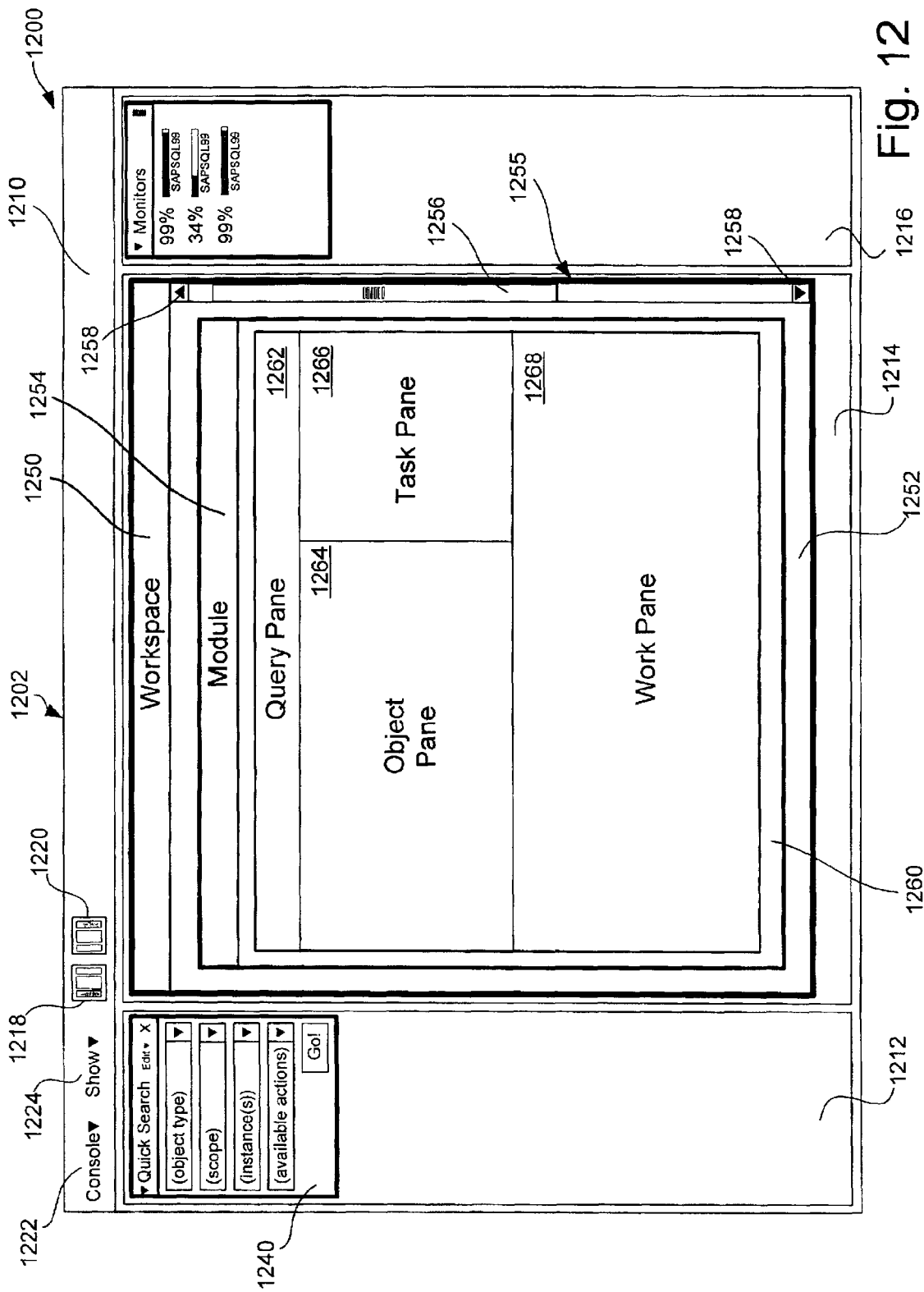
FIG. 12 illustrates general features of a graphical user interface management console incorporating various elements for controlling and accessing the resource management system shown in FIG. 3.

FIG. 12 illustrates some of the elements of a user interface in accordance an embodiment of the present invention. As described above, in an embodiment, the user interface comprises what is referred to herein as a management console 1200, which is rendered in a window of a web browser, such as web browser 311 (FIG. 3). In one embodiment, the rendering of the console 1200 may be handled by the web browser 1211 in accordance with a markup language document, such as, without limitation, an XML document, an HTML document, or a DHTML document. In the case where the consol is rendered in accordance with an XML document, that document may be converted to, and accessed in the form of, a DOM object.

The console 1200 employs a GUI-type visual presentation to convey information to and receive commands from users for controlling or accessing one or more of the resources 306. The console 1200 relies on a variety of GUI elements or objects, including windows, icons, text, drop-down menus, dialog boxes, toolbars, buttons, controls, and the like. A user, such as a system administrator, may interact with the GUI presentation of the console 1200 by, for example and without limitation, using a pointing device (e.g., a mouse) to position a pointer or a cursor over an object and "clicking" on the object or by using keys on a keyboard.

The style and behavior of any component that is laid out on the console can be persisted. Users can completely customize their consoles, specifying everything from the content and configuration of the zones to the level of information displayed in a property page. Customized consoles can be saved for personal use or published for use by others.

As shown in FIG. 12, the console 1200 includes a tool bar 1210 and three zones, including a first tool zone 1212, a work zone 1214, and second tool zone 1216. In one embodiment, the toolbar 1210 is located at an uppermost edge 1202 of the console 1200. It will be appreciated by one skilled in the art that the present invention is not limited to the toolbar described herein, but may encompass any type of toolbar containing control elements or commands for controlling the features of console 1200. The toolbar 1210 may includes any number of controls that are associated with the console 1200. In one embodiment, as shown in FIG. 12, the toolbar 1202 includes a console selection element 1222, a show element 1224, a first zone display element 1218, and a second zone display element 1220. These controls perform specific functions in association with the console 1200, as will now be described.

The console selection element 1222 allows a user to select from among a number of predefined consoles. That is, the user may use the console selection element 1222 to access a number of different "console layouts." Additionally, consoles may be saved, as described below. A system administrator may "author" a number of different consoles, each of which may contain different elements and features. For example, and without limitation, consoles may be authored to include graphical control elements that are appropriate for various scenarios or tasks. Alternatively, consoles may be authored to include graphical control elements that are specific to a specific user's job functions or administrative level.

Figure 13:
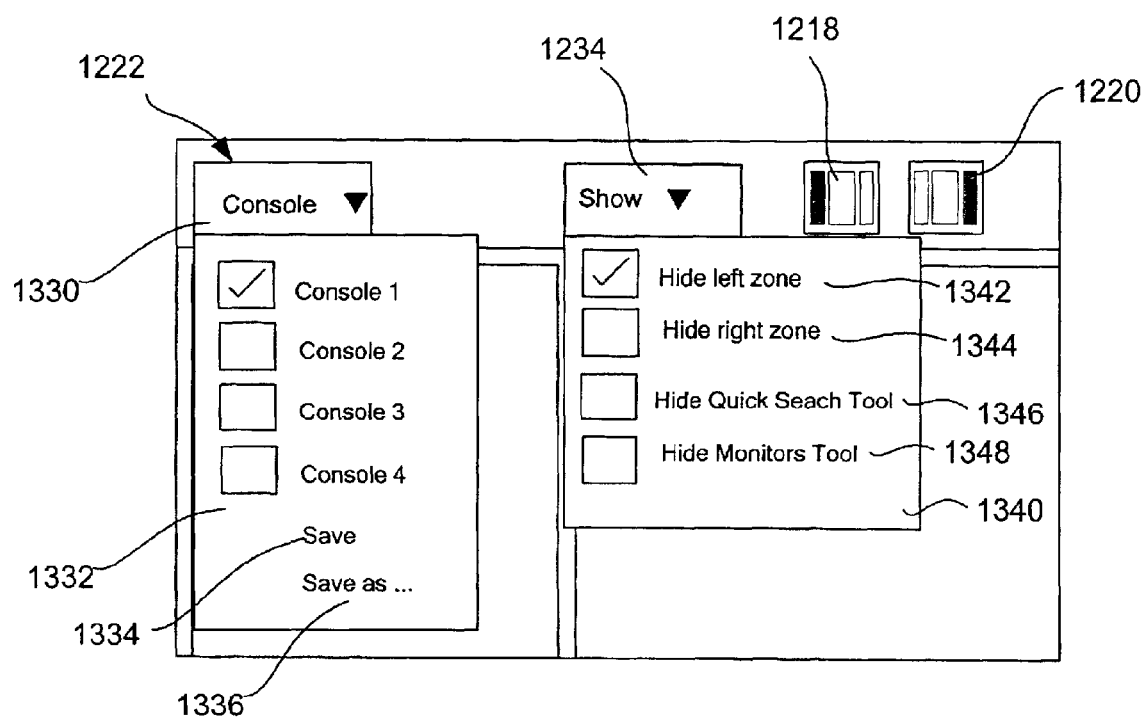
FIG. 13 illustrates various features of the management console shown in FIG. 12.

As shown in FIG. 13, in one embodiment, the console selection element 1222 includes an entry point 1330 and a drop-down menu 1332, including a list of available console layouts, that is exposed for operation by a user via the entry point 1330. The entry point 1330 may be implemented by a conventional toolbar button or menu, or by a special control element. Although this exemplary embodiment includes a visible entry point, those skilled in the art will appreciate that the function of selecting a desired console layout can also be implemented by "clicking" a selected mouse button while the cursor is located over a particular location of the toolbar.

To select a particular console layout, the user may use a mouse (or keyboard) to move a cursor to the entry point 1330, and thereafter click on (or select) the entry point 1330. When the user clicks on the entry point 1330, the drop-down menu 1332 is displayed, as shown in FIG. 13. This exemplary embodiment uses a drop-down menu having selection indicators, which may be implemented as a checkboxes, to indicate whether a particular layout from the list of available console layouts has been selected. To select a particular console layout, the mouse may be used to select the desired console layout. A checkbox is a type of interactive control often found in a GUI and is used to indicate which of the desired console layouts in the menu has been selected.

Additionally, located in the drop-down menu 1332 of the console selection element 1222 are a console "save" element 1334 and console "save as" buttons 1336. The console "save" element 1334 may be used to save the current state of the console layout 1200, under the current console name. In contrast, the console "save as" element 1336 may be used to save the current state of the console 1200 under a different console name. In one embodiment, the console "save" element 1334 and the console "save as" 1336 element 1336 may be implemented as buttons located in the drop-down menu 1332, as shown in FIG. 13. Once the saved, the layout of a console may be save, for example as an XML file, by the persistence manager 334. The selection of these elements may then be accomplished by "clicking" the buttons using a mouse. However, the console "save" element 1334 and the console "save as" element 1236 may also, or alternatively, be located in other areas of the console 1200.

As shown in FIG. 13, the show element 1224 allows a user to hide and/or show the first 1212 and second 1216 zones. In one embodiment, the show element 1224 is presented and operates in a similar manner to the console selection element 1222, as a show drop-down menu 1340. Located in the show drop-down menu 1340 are a "hide left zone" element 1342 and a "hide right zone" element 1344. The "hide left zone" element 1342 allows a user to select or deselect the display of the first zone 1212. The "hide right zone" element 1344 allows a user to select or deselect the display the second zone 1212.

In addition to the "hide left zone" element 1342 and the "hide right zone" element 1344, in one embodiment, the show drop-down menu 1340 may also include other elements for selecting or deselecting the display of the various tools located in the first zone 1212 and/or the second zone 1216 of the console 1200. For example, as shown in FIG. 13, the show drop-down menu 1340 includes a "hide quick search tool" element 1346 and a "hide monitors tool" element 1348. The selecting or deselecting of the display of various the various tools located in the first zone 1212 and/or the second zone 1216 of the console 1200 may be accomplished in a similar manner as that described above with respect to the "hide right zone" element 1344 and the "hide left zone" element.

Returning to FIG. 12, the first zone display element 1218 allows a user to "toggle-off" and/or "toggle-on" the first zone 1212. That is, the first zone display element 1218 allows a user to add or remove the first zone 1212 from the console 1200. As shown in FIG. 13, the first zone display element 1218 may be implemented as a button. In this embodiment, the user positions the mouse over the first zone display button 1218 and clicks on the button 1218 to "toggle" the button between a first state, where the first zone 1212 is displayed in the console 1200, and a second state where the first zone 1212 is not displayed in the console 1200. A number of mechanisms may be employed to indicate when the first state has been selected. For example, giving focus to or highlighting the button 1218 when the first state is selected, changing the color of the selected button 1218 when the first state is selected, displaying a different icon, such as a light bulb, when the first state is selected, or using radio buttons, etc.

The second zone display element 1220 allows a user to "toggle-off" and/or "toggle-on" the second zone 1216. That is, the second zone display element 1220 allows a user to add or remove the second zone 1216 from the console 1200. The second zone display element 1220 may be implemented in a similar manner to that just described with respect to the first zone display element 1218.

In an embodiment of the present invention, the first zone 1212 and the second zone 1216, are operable to display one or more tools, where a tool is a graphical user interface element that provides a user quick access to features or functions of the console 1200. For example, as shown in FIG. 12, the first zone includes a quick search tool 1240, which provides a hierarchical selection structure to enable the user to quickly search for different objects and to populate the work zone 1214. As also shown in FIG. 12, the second zone includes a monitor tool that displays the status of CPU usage.

The work zone 1214 is where much of the functionality of the console 1200 is carried out. As shown in FIG. 12, the work zone 1214 has displayed therein a workspace 1250. Each workspace typically maps to a single job function, such as managing servers or printers. While numerous workspaces may be viewed in the work zone 1214, in one embodiment of the present invention only a single workspace may be viewed at a time in the work zone 1214. However, in the case where a console includes more than one workspace, a user may use a browser tool to access the various workspaces, as described in greater detail below.

Located within the workspace is workspace window 1252, which is operable to display one or more modules 1254. Also included in the workspace 1250 is a scroll bar 1255. The scroll bar is a graphical control element that allows a user to view information outside of the viewing area of the workspace window 1252. For example, the scroll bar 1255 may be used to scroll the workspace window 1252 in a manner that brings one or another module of the modules present in the workspace 1250 into view in the workspace window 1252. As is typical, the scroll bar 1255 includes a scroll box 1256 that may moved up and down inside the scroll bar using a mouse. Scroll arrows 1258 at each end of the scroll bar 1255 can be also be clicked to move the viewing area of the workspace window 1252 in a specified direction. Additionally, the scroll box may be moved up and down inside the scroll bar 1255 by clicking inside of the scroll bar in an area not occupied by the scroll box 1256, as is conventional.

Located within the workspace window 1252 are one or modules 1254. Where a workspace is mapped to job functions, modules 1254 typically map to a specific object(s) upon which work is done. As discussed above, there are two types of distinct modules—those which reside in a workspace and pertain to a specific object type and those which reside in the first and second zones, herein referred to as tools. Table 8, shown below, illustrates a list of several modules that may be displayed within the various zones.

TABLE 8

Example Modules

| Module Name | Function |
| --- | --- |
| Quick Search | Module to launch and perform any job function by quickly searching object types. |
| Explorer | Launch point for workspaces and modules provides user with a snapshot of the current state of the console. |
| Monitors | Provides user with a snapshot of the status of requests, tasks, or objects. |
| Notifications | Provides user with explicit notifications when predetermined rules are met. |
| Advanced Search | Provides advanced search functions for the user beyond capabilities of Quick Search. |
| Browse | Alternative searching capability through Browse techniques. |
| Results List | Workspace area for storing the results of a query, may be provided by the Quick Search or Advanced Search function. |
| Task List | Workspace area provided to display a list of tasks associated with given instances. |
| Task Pads | Tool that allows for customization of available tasks. |
| Property Sheets | Workspace display of various properties for the particular object selected. |
| Wizards | Wizards provide the ability to specify complex workflow relationships between pages. |
| Graphs | Workspace area for viewing various data, such as monitored data in graph format. |
| Editable Grid | Editable Grid functions similar to a spreadsheet. Provides the user the ability to view, edit and modify tabular data. |
| Drawing Surface | Drawing area providing visual display of workflow for such items as Wizards and other components. |
| Enterprise Event Log | Viewer to provide administrator with the useful display of events alerts or trouble areas. |
| Scheduling | Module for scheduling events for managed objects. |
| Hosted or Spawned Applications | Other applications used within a predetermined workspace, such as Instant Messenger or Terminal Server. |

Each modules 1254 contains a module window 1260. Each module window 1260 includes one or more associated panes. As shown in FIG. 12, in one embodiment, the module window 1260 includes four distinct panes: a query pane 1262, an object pane 1264, a task pane 1266, and a work pane 1268.

Figure 14:
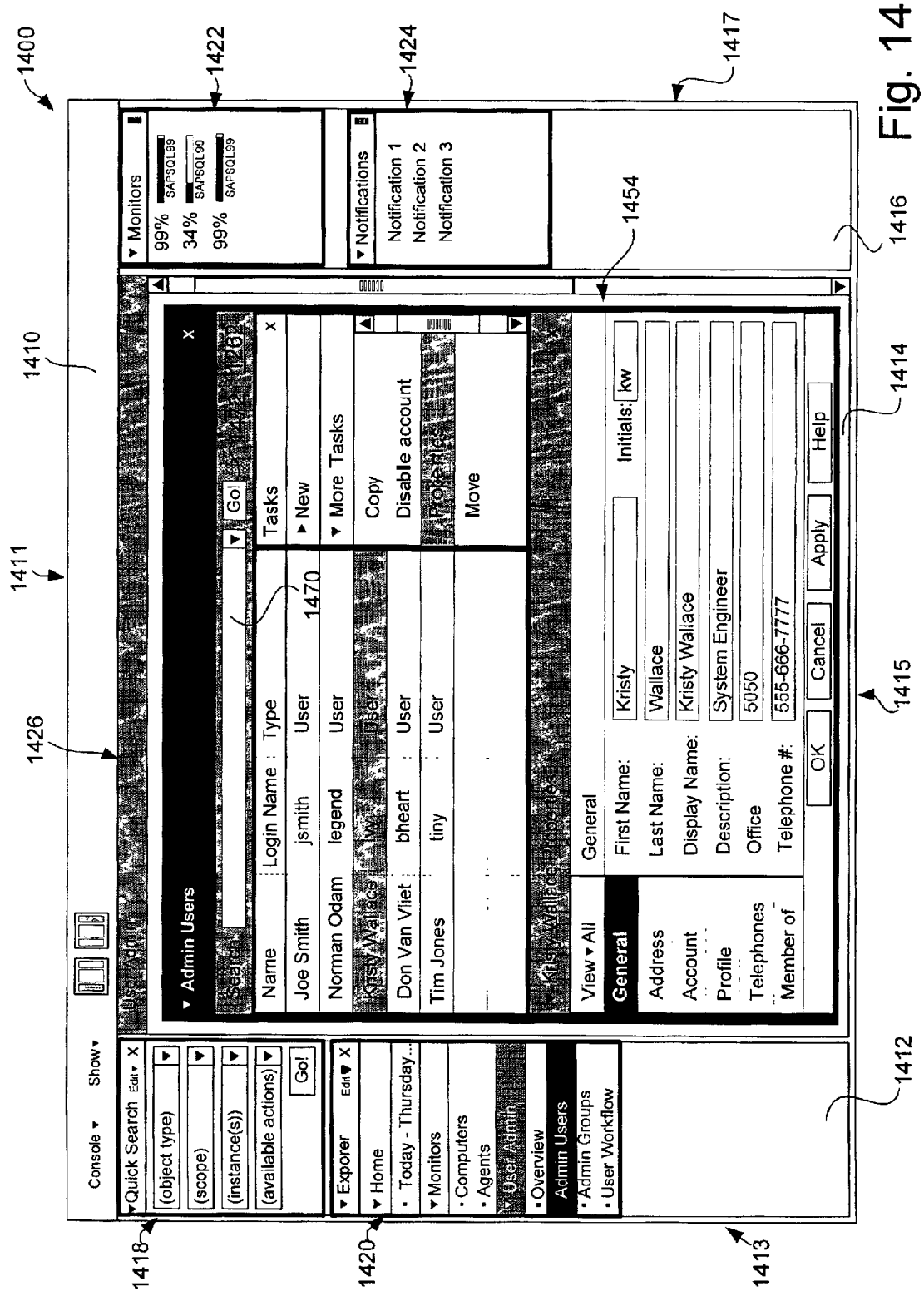
FIG. 14 illustrates additional features of, and further embodiments of, the management console shown in FIG. 12.

In general, the object pane 1264 is operable to display information about one or more objects that are applicable to the module 1260 in which the object pane 1264 resides. For example, the object pane 1264 may include a list of objects associated with a given module that may be selected for access by a user. The objects in the object pane may be presentation in a number of ways, depending on the number of objects to be displayed and the preferences of the author of the console 1200. For example, and without limitation, the objects may displayed in a simple object list of object instances, as shown in FIG. 14. A user may then select one or more of the objects instances in the list for accessing.

The task pane 1266 is operable to display various tasks that are or applicable to, and available for, an object that has been selected in the object pane. As with the object pane, tasks in the task pane 1266 may be presentation in a number of ways, depending on the number of tasks to be displayed and the preferences of the author of the console 1200. For example, and without limitation, the tasks may displayed in the task pane 1266 as a simple task list, as shown in FIG. 14. A user may then select one or more of the tasks in the list for access.

Once a task has been selected from the task list 1266, the function of the selected task may be immediately carried out or, alternatively, a work pane 1268 may be displayed showing additional information and/or presenting additional functionality, or sub-tasks, related to the selected task. The additional information, the presented additional functionality, and/or the related sub-tasks, may be displayed in the work pane 1268 in a number of ways, depending on the type of information or functionality that is to be displayed and the preferences of the author of the console 1200.

The query pane 1262 is operable to search multiple resources associated with the software environment 300 (FIG. 3). As described previously, network administrators may work with many different objects of differing types. In a typical network administration environment objects are usually only accessible through applications that are specific to either one or a small collection of object types. Thus, if an network administrators needs to work with a specific object or group of objects, the network administrators must first navigate to the application that is associated with the desired object type and then navigate to the specific object or group of objects. This does not provide an integrated user experience. In contrast, the query pane 1262 provides an integrated manner in which objects from multiple resources may be accessed. That is, the query pane 1262 provides one mechanism by which the object pane 1264 may be populated by objects from or related to a variety of references.

The query pane 1262 may be presented in a number of ways, depending on the type of resources that are to be queried and the preferences of the author of the console 1200. In one embodiment, such as shown in FIG. 14, the query pane 1262 may comprise a simple text box 1470 for entering terms for a desired query using a keyboard. A mouse may then be used to click a "Go!" button 1472 to initiate the query.

In one embodiment, the result of executing a query produces one of three states: 1) no objects found; 2) one object found; or 3) multiple objects found. If an object or multiple objects are found, they are displayed in the objects pane 1264. As such, refreshing or modifying the query may result in different objects being displayed in the object pane.

The query pane provides a unique and cohesive approach to object selection and management. Instead of requiring the network administrators to navigate to an application and then navigate to an object or group of objects, as was common in prior network administration tools. The query pane 1262 allows a network administrators to navigate directly to an object or group of objects. Once an object(s) is located the network administrators is then able to perform all task that are associated with that object(s).

Turning now to FIG. 14, shown therein is an exemplary console 1400, displaying a toolbar 1410 positioned at the top 1411 of the console 1400, a first zone 1412 positioned on the left side 1413 of the console 1400, a second zone 1416 positioned on the right side 1417 of the console 1400, and work zone 1414 positioned in the center 1415 of the console 1400. Displayed in the first zone 1412 are two tools, a quick search tool 1418 and an explorer tool 1420. Displayed in the second zone 1414 are another two tools, a monitors tool 1422 and a notifications tool 1424. Displayed in the work zone 1414 is a user administration workspace 1426 containing a module 1454. It will be understood that the particular console shown in FIG. 14 is but one example of a console and is presented here to provide a better understanding of various functionality and display characteristics that may be available with respect to a console. As such, the layout and functions of the particular console shown in FIG. 6 are not intended to encompass all feature, layout, and/or functionality that may be presented in a console.

As described above, the quick search tool 1418 provides a hierarchical selection structure that enables a user to quickly search for different objects from a variety of resources and to populate the work zone 1414. More particularly, the quick search tool 1418 includes GUI controls that allow a system administrator to easily combine a specific object instance (or instances) and an action to be performed against that object instance, as well as specify the scope of the search.

Figure 15:
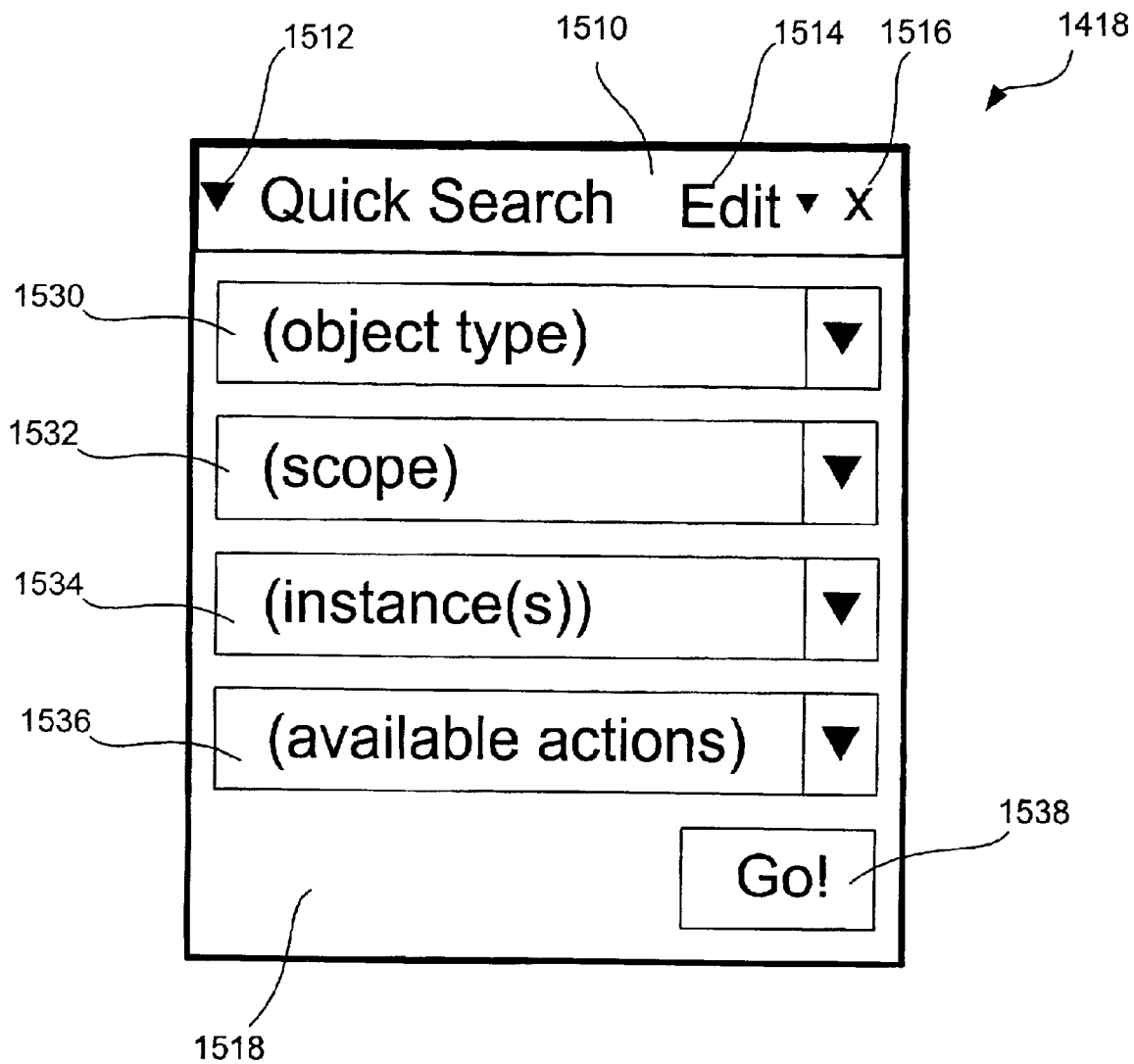
FIGS. 15–19 illustrate various details and features of a quick search tool shown in the management console of FIG. 14.

As shown in FIG. 15, the quick search tool 618 employs common GUI controls such as the drop-down menus, text boxes, and buttons. The controls are arranged logically to support a simple work flow for performing the action of specifying an object instance-action pair to be found. In an embodiment, the quick search tool 618 includes a tool bar 1510, including a quick search drop-down menu selector 1512, an edit element 1514, and a quick search close element 1516. The quick search drop-down menu selector 1512 includes a triangular visual element that may be "clicked" on by a mouse to open or close a quick search drop-down menu 1518, in a conventional manner. The quick search close element 1516 includes an x-shaped visual element that may be "clicked" on by a mouse to close the quick search tool 1518, in a conventional manner.

In one embodiment, the quick search drop-down menu 1518 includes an object type selection element 1530, a search scope selection element 1532, an instance(s) selection element 1534, an action selection element 1536, and a quick search initiation element 1538, each of which will now be described.

The object type selection element 1530 provides a graphical representation of the various object types that are searchable by a user, such as a system administrator. The number and selection of the various object types that are displayed by the object type selection element 1530 may be preselected, such as by an author of a consol. Additionally, the number and selection of the various object types that are displayed by the object type selection element 1530 may vary when either a different console 1400 or a different workspace 1426 are selected.

Figure 16:
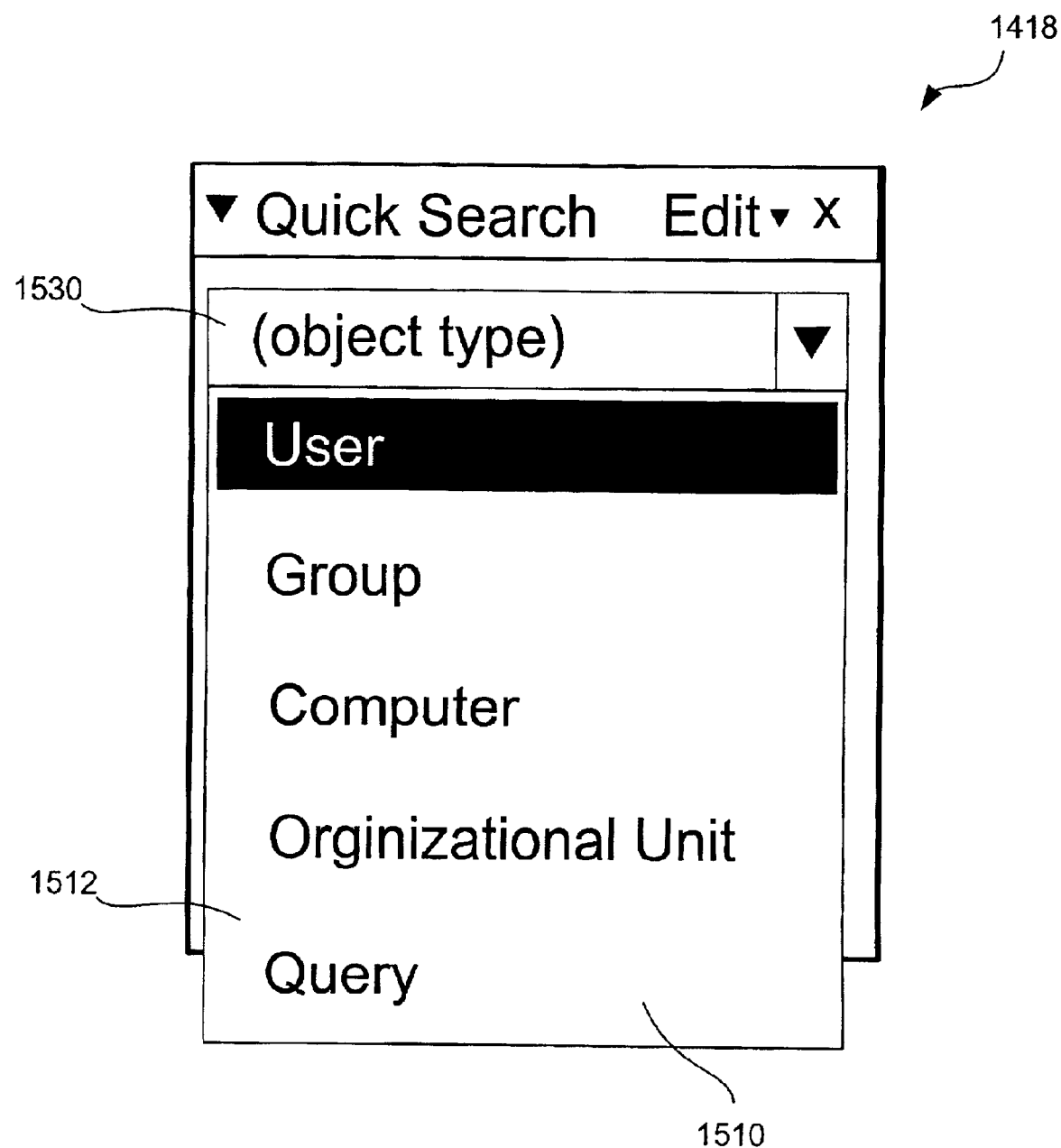

The object type selection element 1530 may display the various object types for selection in a number of ways. Furthermore, the object type selection element 1530 may provide any number of different mechanisms by which an object type may be selected from the display of the various object types. For example, and without limitation, the object type selection element 1530 may display the various object types for selection in the form of a list of objects in a drop-down menu 1610, as shown in FIG. 16. A user of the quick search tool may then select a particular object from the list of objects 1612 by clicking on a desired object with a mouse. Alternatively, the user of the quick search tool could select a particular object from the list of objects 1612 using keys on a keyboard. For example, a user could use up and down arrow keys on a keyboard to navigate the list of objects 1612.

Once the user has selected a particular object from the list of objects 1612, the search scope selection element 1532 is enabled and may be used to define the scope of the desired quick search. In one embodiment, the user may define the scope of the search either by entering a desired scope. Alternatively, based on the type of object selected, the scope of the search may be defined to reflect an appropriate list of areas within which to search for the object instance the user has specified. For example, as shown in FIG. 16, the user has selected a user object. If, for example, instances of the user object are stored in the Active Directory. In such a case, the scope of the search may involve selecting the domain in which to search. As another example, if the instance is stored in a SQL Server database, then the scope would most likely be a list of database names.

The search scope selection element 1532 may display the various search scopes for selection in a number of ways. Furthermore, the search scope selection element 1532 may provide any of a number of different mechanisms by which a search scope may be selected from the display of the various search scopes. For example, and without limitation, the search scope selection element may display the various scopes for selection in the form of a list in a drop-down menu, in the same manner as described above with respect to the object type selection element 1530 shown in FIG. 16. A user of the quick search tool 1418 could then select a particular scope from the list of scopes by clicking on the desired scope with a mouse. Alternatively, the user of the quick search tool could select a particular scope from the list of objects using keys on a keyboard.

Figure 17:
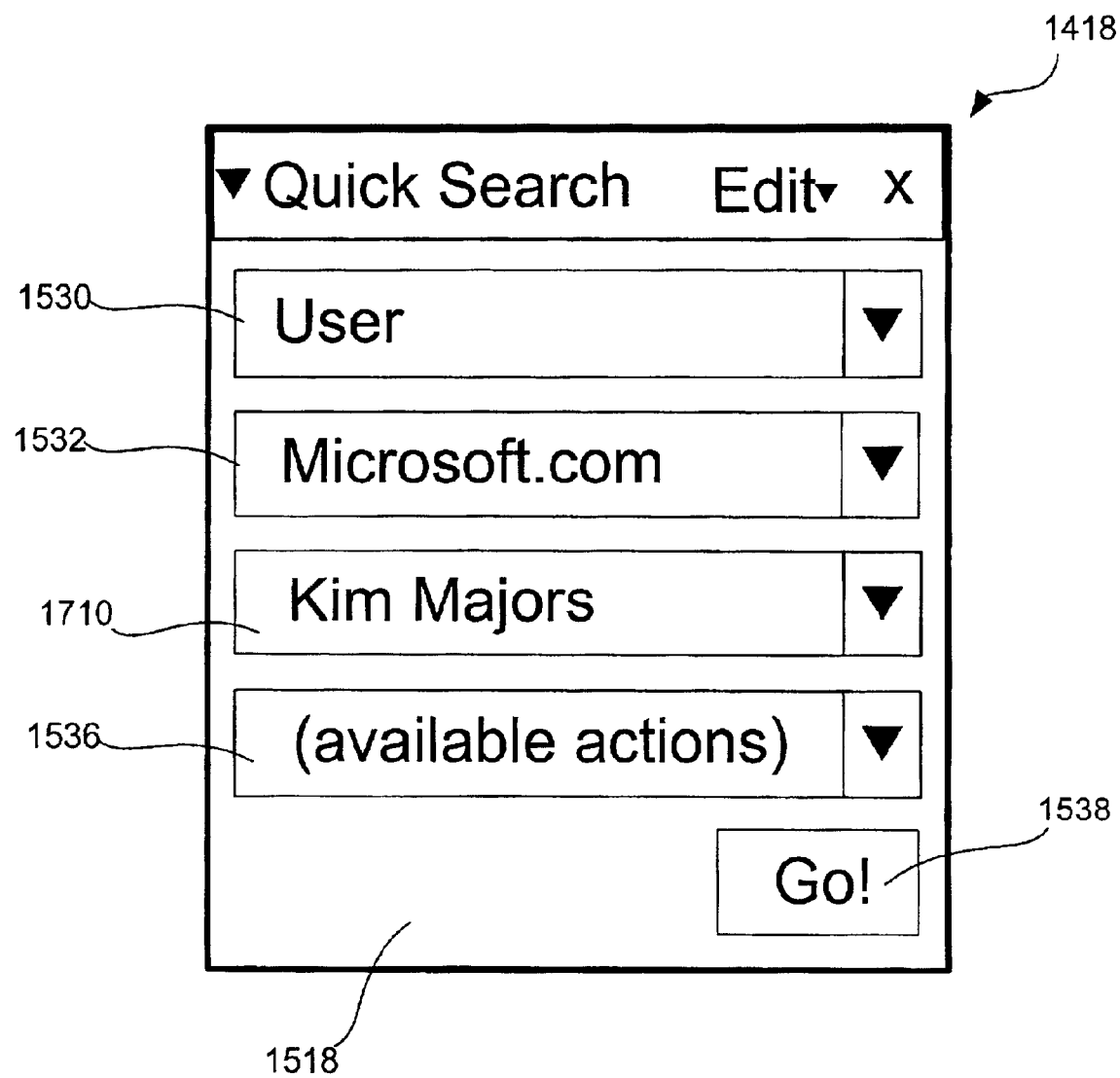

As shown in FIG. 17, the object type (User) has been selected, as shown in the search scope selection element 1532. Because the instances of this object type are stored in an Active Directory, the scope would be a list of domain names. In the example shown in FIG. 17, the user has accepted the default domain, Microsoft.com, and that scope is shown in the search scope selection element 1532.

After selecting a particular scope for the search, the user may then select an instance of the object type specified using the instance selection element 1534. An instance of an object type is specific, named object. For example if an object is of a type 'User', then the instance will be an actual user. The instance selection element 1534 may display the various instances for selection in a number of ways. Furthermore, the instance selection element 1534 may provide any of a number of different mechanisms by which a instance may be selected from the display of the instances. For example, and without limitation, the instance selection element 1534 may display the various instances for selection in the form of a list in a drop-down menu. Alternatively, the instance selection element 1534 may allow the user to input the desired instance(s) manually. For example, as shown in FIG. 17, the user may type a desired instance(s) into a text box 1710 in the quick search drop-down menu 1518. Additionally, by using a delimiter such as a semi colon, the user may specify multiple instances. The user may also employ "wildcards," such as an asterisk or a question mark, etc., when specifying instances. Instance names will typically be a unique identifier for the object type. For example, if an Active Directory's user object has been selected the instance name might be a logon name.

Figure 18:
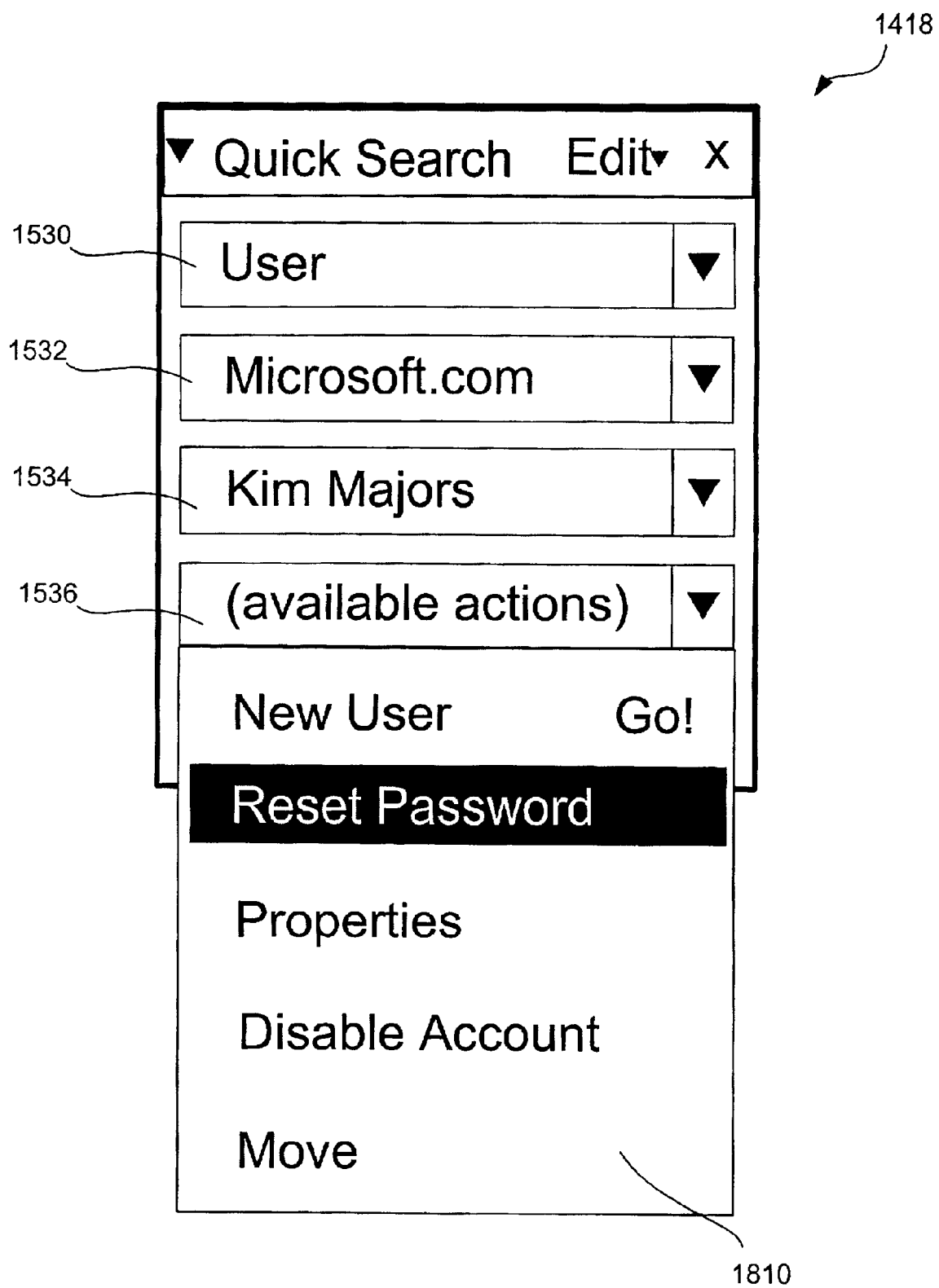

After selecting a particular instance(s) for the search, the user may select from a number of actions that are available for the selected object type, scope, and instance(s) using the action selection element 1536. The action selection element 1536 may display the various actions for selection in a number of ways. Furthermore, the action selection element 1536 may provide any of a number of different mechanisms by which an action may be selected from the display of the actions. For example, and without limitation, the action selection element 1536 may display the various instances for selection in the form of a action list in a drop-down menu 1810, as shown in FIG. 18. A user of the quick search tool 1418 could then select a particular action to be completed from the list of actions by clicking on the desired action with a mouse. Alternatively, the user of the quick search tool 1418 could select a particular action from the list of actions using keys on a keyboard.

The available action list is populated with a list of allowable actions for the selected object, again provided to the configuration manager by the resource during the installation process. As discussed above, available actions may be segmented into static and dynamic tasks. A static action or task is one that the resource knows will be associated with all instances of the given object, e.g. the reset password action is one that is associated with all user objects and can therefore be labeled as static. A dynamic task on the other hand is a task that may or may not be associated with a given object depending on its state, e.g. a "disable account" task is one that is only valid for users who's accounts are enabled. If a user's account is already disabled then the "disable account" task is not displayed in the available actions list, e.g., list 1014. In an embodiment, the drop down list on the quick search pane is populated only with static tasks. Once the results set has been returned and a specific object has been selected then the task list in the search module will be populated with both dynamic and static tasks. The tasks are obtained by querying the task manager, discussed above.

Figure 19:
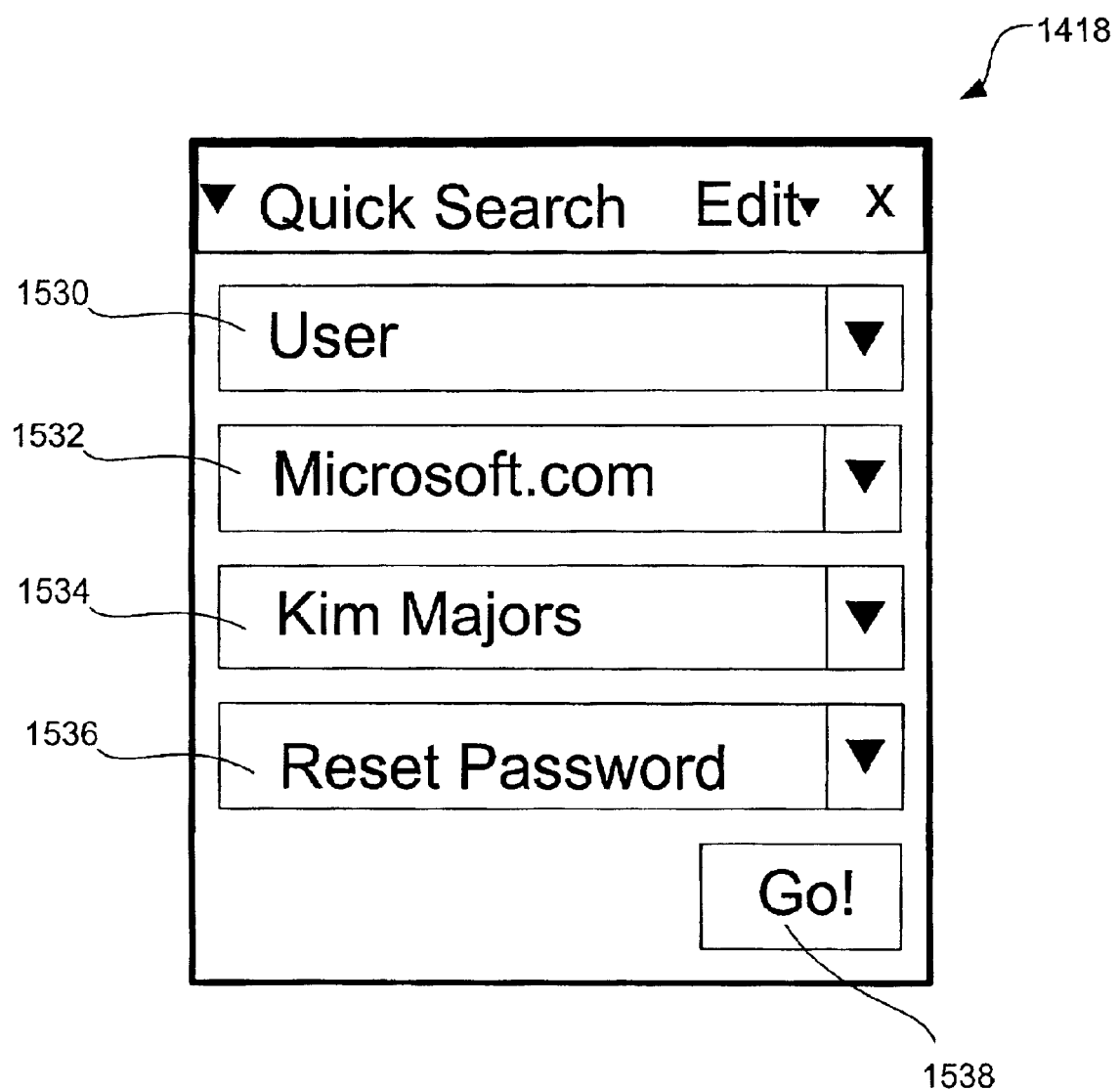

Once a user has selected an object type, scope, instance (s), and action, the search is initiated using quick search initiation element 1538. The quick search initiation element 1538 may be displayed in a number of ways. For example, and without limitation, the quick search initiation element 1538 may display as a search button, as shown in FIG. 19. To initiate the search, the user may then click on the search button 1538. In the example shown in FIG. 19, the search button is labeled "Go!" However, it will be understood that other labels are possible to indicate the function of the search button 1538 (e.g., Search, Begin, Start, OK, etc.).

In one embodiment, it is not necessary for the user to select an action with the action selection element 1536 before a search is initiated. In such a case, if the user does not select an action, the results of the search will be returned for whatever object instance(s) has been selected, together with all associated actions.

When the user selects GO button 1538, a search string is generated and embedded in an XML document described above with respect to Table 7. The XML document is passed to the search management service (an asmx file that exposed the search manager object) and then passed directly to the search manager 324. The search manager 324 parses the query string in the XML document to obtain the object type identification. The search manager then searches an object type database and obtains the XML schema for the provided object type, such as during the determine operation 1106 described above. The search manager then inserts the query string from the query string XML document into an attribute designated as quick searchable.

The resulting XML document has both an object type definition and a search string, and this XML document makes up the query that is passed along to the resource. This query contains the URL or other identifier for the search handler, as specified by the plugin. The search manager 324 reads the value of the search handler URL and creates a proxy, passing it the URL and the XML query. The proxy enables the system to reach the URL regardless of its location (e.g. behind a firewall etc.) as shown in FIG. 10.

In a particular embodiment, the proxy communicates the query XML document to the search handler using SOAP as shown in FIG. 10. Alternatively, other communication protocols may be used. In this embodiment, the search handler (an asmx file—compiled ASP+) must expose the method "ExecuteSearch" that takes the XML query as a parameter. Once the resource has performed its search it returns the results to the search manager by embedding them in another XML schema and returning this XML as a string from the search handler. The search manager 324 parses the file and sends the results set to the user interface which displays them in a module that was opened in the consol by the quick search tool 1418 as soon as the user selected the GO button 1538.

Figure 20:
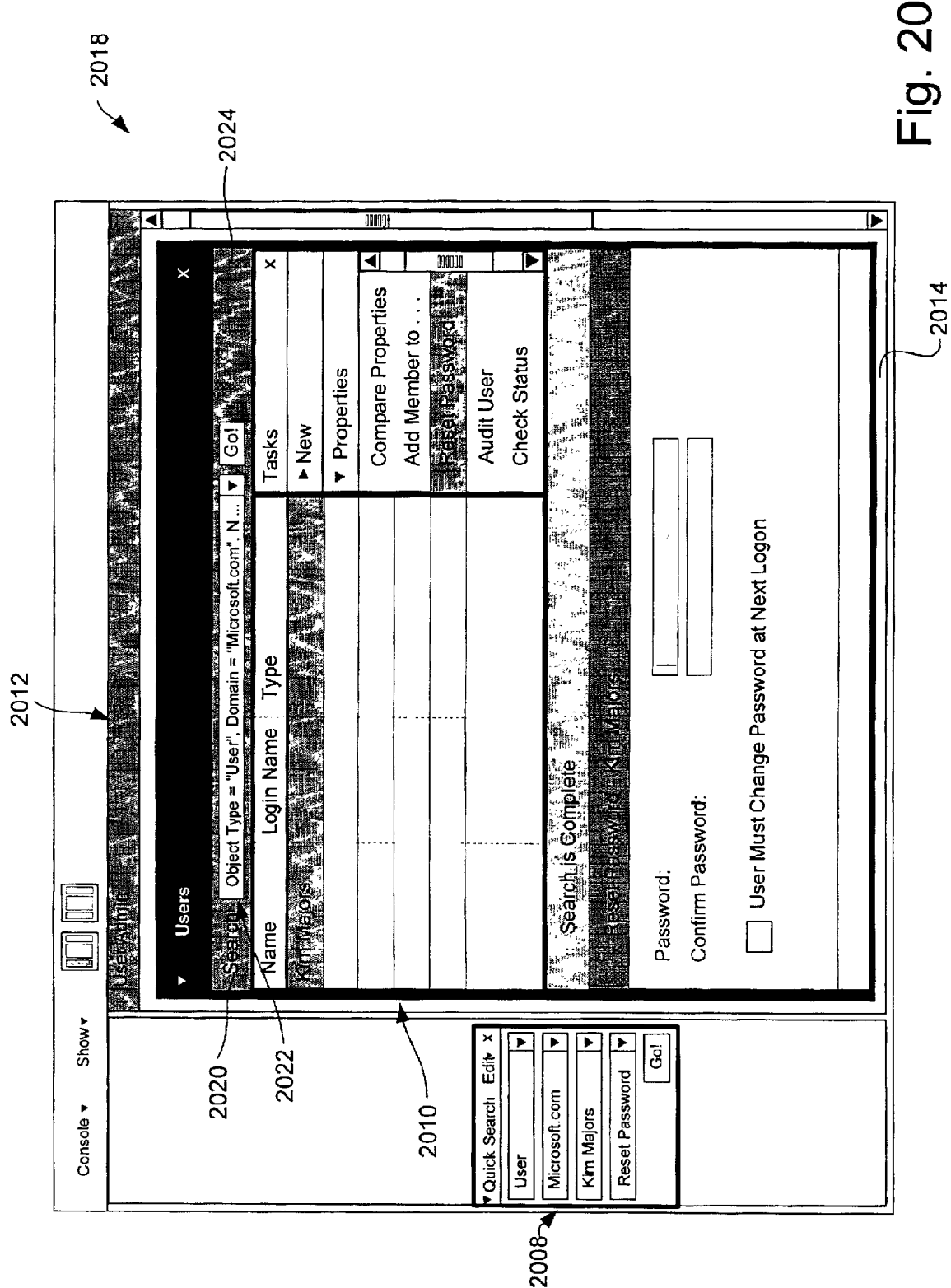
FIG. 20 illustrates user interface elements that are generated in the management console of claim 3 as a result of a search performed with the quick search tool shown in FIGS. 15–19.

Once a quick search has initiated, the results of that search may be displayed in a number of different ways in the console 1200. For example, as shown in FIG. 20, the results of the defined search are displayed in the module 2010 in a workspace 2014 in a work zone 2016 of a consol 2018. As shown in FIG. 20, in an embodiment, parameters of the search that have been performed may be displayed as a search string 2022 in a window search 2020 located in a search pane 2024 within the module 2010. In such a case, the user may then perform a new or additional search by modifying the search string 2022 in the search. A search initiation element 2026, such as a button, may then be used to start the search.

Using the above system and method, administrators are able to use a search driven model for locating and working with objects, of differing types, without having to navigate through varying applications will increase user satisfaction and productivity. That is, since administrators work with many different objects of differing types, the above system provides a framework that allows an administrator to work with a specific object or group of objects, without first navigating to the application that is associated with the desired object type and then navigating to the specific object or group of objects. Instead of requiring the user to navigate to an application and then navigate to an object or group of objects, the above framework allows the user to navigate directly to the object or group of objects. Once an object(s) is located, the user is able to perform all tasks that are associated with that object(s).

Returning now to FIG. 14, as described above, the console 1400 shown therein includes an explorer tool 1420. In general, the explorer tool 1420 is a navigation tool that is used to show workspaces and modules in the work zone 1414. The particular workspaces and modules that are shown in the work zone 1414 depend on which workspaces and modules are developed and/or installed for a particular console 1400. As shown in FIG. 14, the explorer tool 1420 includes a number of graphical display elements that permit the selection of workspaces and modules using common GUI controls.

Figure 21:
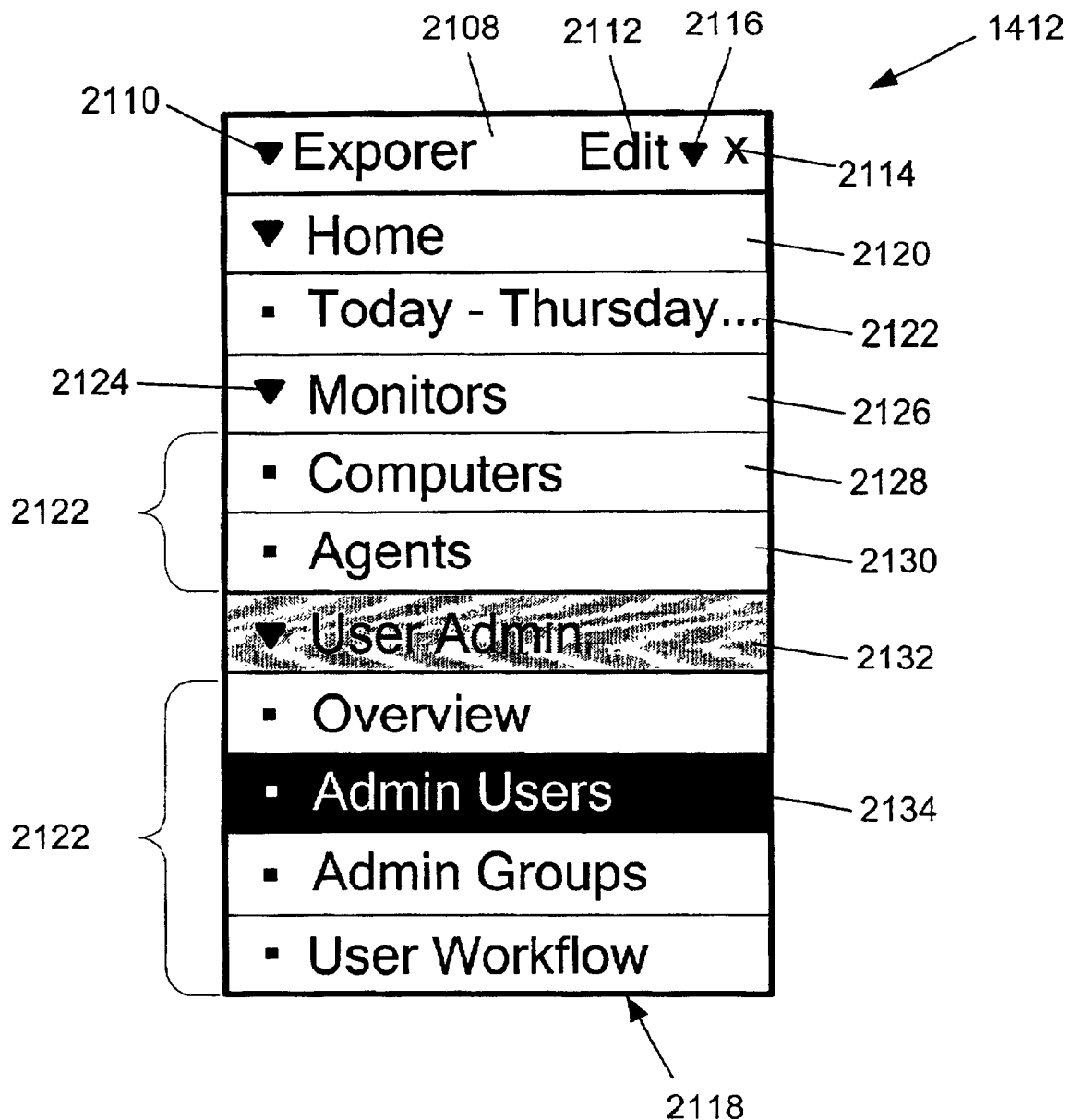
FIG. 21 illustrates various details and features of an explorer tool shown in the graphical user interface of FIG. 14.

FIG. 21 illustrates an enlarged view of the explorer tool 1420 shown in FIG. 14. As shown in FIG. 21, in one embodiment, the explorer tool 1420 includes a tool bar 2108, having an explorer drop-down menu selector 2110, an edit element 2112, and a explorer close element 2114. The explorer drop-down menu selector 2110 includes a triangular visual element 2116 that may be "clicked" on by a mouse to open or close an explorer drop-down menu 1318, in a conventional manner. The explorer close element 2114 comprises an x-shaped visual element that may be "clicked" on by a mouse to open or close the explorer tool 1412, in a conventional manner. In one embodiment, the edit element 2112 provides functionality for a user to add, delete, and/or move workspaces within the explorer.

The explorer drop-down menu 2118 is operable to display a list of workspaces 2120 and modules 2122 associated with the workspaces 2120, as shown in FIG. 21. Each of the workspaces 2120 shown in the explorer drop-down menu 2118 includes a triangular element 2124 that may be "clicked" on by a mouse to open or close an drop-down list 2118 of modules associated with that workspace 2120. For example, as shown in FIG. 21, the monitors workspace 2126 displayed in the explorer drop-down menu 2118 has associated therewith a computers module 2128 and an agents workspace 2130.

In an embodiment, a visual indicator may be associated with a selected workspace and/or module. A number of mechanisms may be employed to indicate a particular workspace and/or module has been selected. For example, as shown in FIG. 21, the User Admin workspace 2132 and the associated Admin User module 2134 have been highlighted to show that they have been selected.

Selection of a particular workspace 2120 in the explorer tool 1420 will cause that particular workspace to be displayed in the work zone 1414 of the console 1400, as shown in FIG. 14. Additionally, selection of a particular module 2122 in the explorer tool 1420 will cause that particular module to be displayed in the workspace 2120 that has been selected. In one embodiment, the first time a particular workspace 2120 is selected in this manner, it will be displayed with all available modules 2122 open, with the topmost module appearing at the top of the selected workspace 2122. Subsequent times the particular workspace is selected from the explorer tool 1420, the particular workspace will be displayed in the same state as it was last viewed.

There may be any number of explorer tool 1420 taxonomies that define the particular workspaces and modules that will appear in a given explorer tool 1420, and the arrangement of those particular workspaces and modules in a given explorer tool 1420. Table 9 illustrates an exemplary explorer tool taxonomy that may be employed in the management of a number of resources. It should be understood that the particular taxonomy illustrated in Table 9 is not intended to be exhaustive or limiting in any way. The exemplary explorer tool taxonomy simply provides one example taxonomy to illustrate how an explorer tool taxonomy may be arranged.

TABLE 9

Example Explorer Tool Taxonomy

Figure 22:
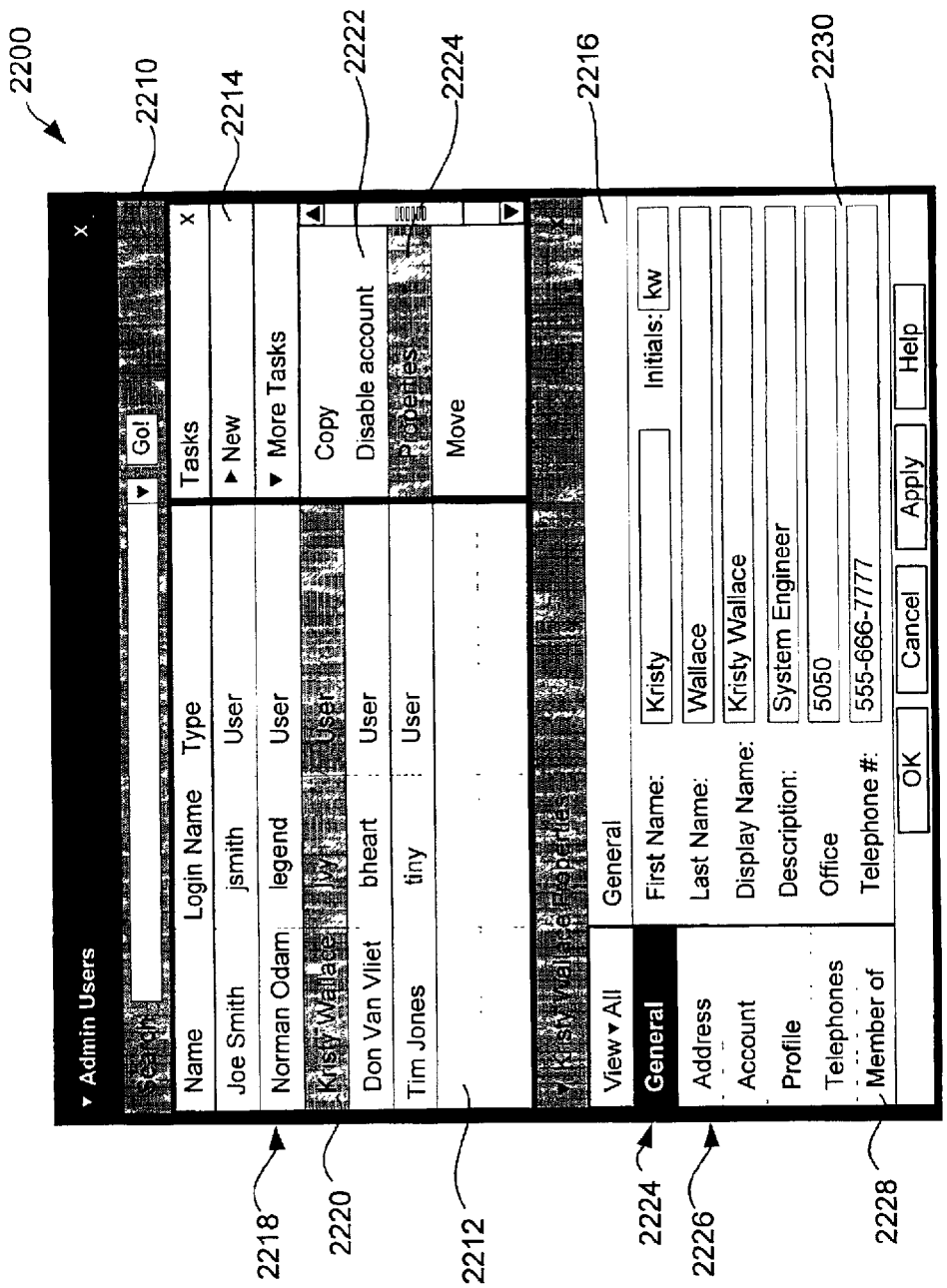
FIG. 22 illustrates various elements of an exemplary module for use in the management console shown in FIG. 12.

Users
    Users
    Groups
Servers
    Services
    Registry
    Protocols
    DNS
    DHCP
    WINS
Databases
    SQL
    Oracle
    DB2
    Informix
Messaging
    Conferencing Server
    Exchange
Clustering
Applications
    Application Center Server
    Versions TABLE 9-continued Example Explorer Tool Taxonomy Security
    Kerberos
    PM
    IPSec
Performance Monitoring
    Counter Collection
    Thresholds
    Application Dependencies
Operations Management
    Distributed Events
    Model Applications and Dependencies
    Availability
    Change
    Configuration
    SLAs
Clients
    Software Distribution
    Add/remove Programs
Hosting
    Web Structures
    FTP
Printers
    Printers
    Fax
Multimedia
    Net Meeting
    Net Theater
    Streaming Media
    Storage
    RAID
    Backup
Files and Shares
DFS
Group Policy Turning now to FIG. 22, illustrated therein is an exemplary module 2200 including a query pane 2210, an object pane 2212, a task pane 2214, and a work pane 2216. As shown in FIG. 22, the object pane 2212 includes a list of objects 2218. It is from this list of objects 2218 in the object pane 2212 that a particular object may be selected for access by a user. For example, the object 2220 titled "Kristy Wallace" has been selected from the object list 2218 shown in FIG. 22, as illustrated by highlighting.

In response to the selection of the particular object 2220, a list of applicable tasks 2222 is displayed in the task pane 2214. Included in the list of applicable tasks 2222 is a properties task 2224, that has been selected in the task pane, as shown by highlighting. In response to the selection of the properties task 2224, the work pane 2216 has been populated with a property sheet 2226 associated with the particular object 2220 selected in the object pane 2212.

Included in the property sheet 2226 is a list of property pages 2228 that are associated with the property sheet 2226. Included in the list of property pages 2228 is a general property page 2224 that has been selected, as shown by highlighting. In response to the selection of general property page 2224, the work pane 2216 has been populated with a property page 2230 including number of controls for editing the general property page 2224. In one embodiment, the user may, at this point, compare various property sheets for different objects by simply selecting another object in the object pane. For example, the user may use the tab key to "tab" between the objects in the object pane. In such a case, the property sheet for the newly selected object will replace the property sheet of the previously selected object in the work pane.

Figure 23:
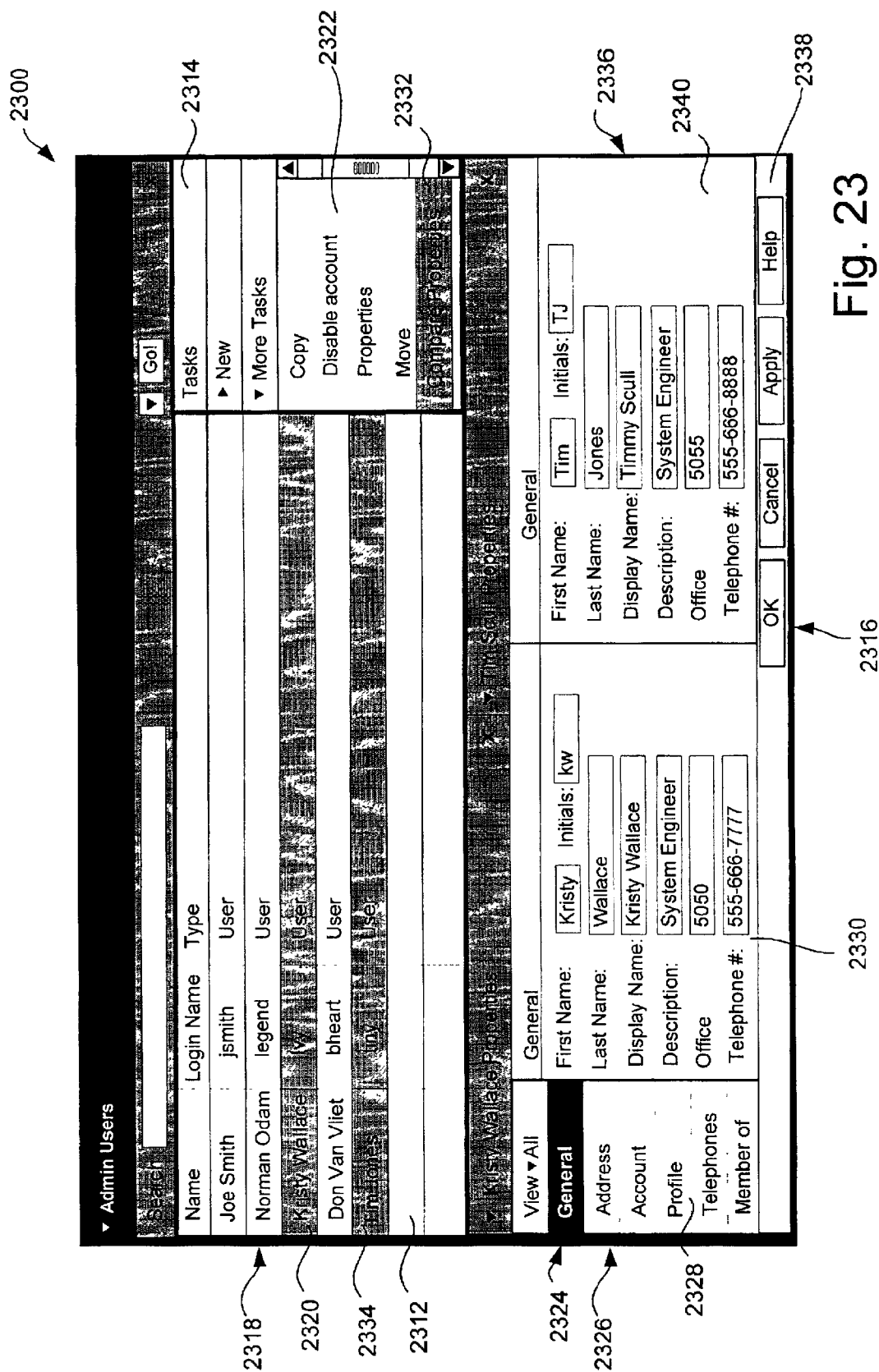
FIG. 23 illustrates another embodiment of an exemplary module for use in the management console shown in FIG. 12.

FIG. 23 illustrates a feature of an embodiment of the present invention, wherein two or more property pages can be viewed in a single window at the same time. The basic layout of the module 2300 shown in FIG. 23 is similar to the module 2200 shown in FIG. 22. However, as shown in FIG. 23, the list of tasks 2322 in the task pane 2314 includes a compare properties task 2332. The function of the compare properties task 2332 is to allow two or more property pages from two or more users to be displayed and/or manipulated in the work pane 2316.

In one embodiment, the selection of multiple property sheets for display and/or manipulating in the work pane 2316 may be accomplished as follows. As shown in FIG. 23, one or more objects are first selected from this list of objects 2318 in the object pane 2312. For example, the object 2320 titled "Kristy Wallace" and the object 2334 titled "Tim Jones" have been selected from the object list 2318.

In response to the selection of the particular objects 2320 and 2334, a list of applicable tasks 2322 has been displayed in the task pane 2314. Included in the list of applicable tasks 2322 is a compare properties task 2332 that has been selected in the task pane, as shown by highlighting. In response to the selection of compare properties task 2332, a section of the work pane 2316 has been populate with a property sheet 2326 associated with the object 2320 titled "Kristy Wallace." Included in the property sheets 2326 is a list of property pages 2328 that are associated with the property sheet 3326. Included in the list of property sheets 2326 is a general property page 2324 that has been selected in the list of property pages 2328, as shown by highlighting. In response to the selection of general property page 2324, the work pane 2316 has been populated with a general property page 2330 associated with the "Kristy Wallace" object 2320, as well as a general property page 2340 associated with the "Tim Jones" object 2320. Each of the property pages includes a number of controls for editing the general property pages 2330 and 2340.

In the case where more than two objects are selected for comparison, the size and position of the work pane 2316, as well as the size and position of the property sheet and associated property pages may be dynamically adjusted. Additionally, if a great number of objects are selected for comparison by a user for display in work pane 2316, alternate display elements may be employed to show the property sheet and property pages. For example, and without limitation, the various property pages may be displayed in a tabular form in the work pane 2316.

Although the invention has been described in language specific to structural features, methodological acts, and computer readable media containing such acts, it is to be understood that the invention defined in the appended claims is not necessarily limited to the specific structure, acts or media described. Therefore, the specific structure, acts or media are disclosed as preferred forms of implementing the claimed invention.

What is claimed is:

1. A display device having rendered thereon a network management console for displaying and accessing objects from a plurality of network resources, comprising:
   a second zone rendered in the console, the second zone including a selected workspace, the selected workspace including at least one module;
   a first zone rendered in the console, the first zone including an explorer tool, the explorer tool displaying a list of workspace names and a list of module names, the list of workspace names including a workspace name associated with the selected workspace, the list of module names including a module name associated with the at least one module;
   wherein the at least one module includes an object pane displaying a list of objects associated with the at least one module;
   wherein the at least one module includes an task pane displaying a list of tasks associated with the list of objects;
   wherein the at least one module includes an indicator indicating that one of the objects in the list of objects has been selected;
   wherein the at least one module includes an indicator indicating that one of the tasks in the list of tasks has been selected;
   wherein the at least one module includes a work pane displaying information related to the selected task and the selected object; and
   wherein the information related to the selected task and the selected object displayed in the at least one module includes a property sheet.

2. A display device as defined in claim 1, wherein the explorer module further includes an explorer tool bar and wherein the list of workspace names is displayed in a drop down menu extending from the explorer tool bar.

3. A display device as defined in claim 2, wherein the list of module names is displayed in a drop down menu extending from the workspace name associated with the selected workspace.

4. A display device as defined in claim 3, wherein the explorer further includes a visual indicator indicating that the workspace associated with the selected workspace name is included in the second zone.

5. A display device as defined in claim 4, wherein the explorer further includes a visual indicator indicating that the module associated with the at least one module name is included in the selected workspace.

6. A display device as defined in claim 1, wherein the at least one module includes an object pane displaying a list of objects associated with the at least one module.

7. A display device as defined in claim 6, wherein the at least one module includes an task pane displaying a list of tasks associated with the list of objects.

8. A display device as defined in claim 7, wherein the at least one module includes an indicator indicating that one of the objects in the list of objects has been selected.

9. A display device as defined in claim 8, wherein the at least one module includes an indicator indicating that one of the tasks in the list of tasks has been selected.

10. A display device as defined in claim 9, wherein the at least one module includes a work pane displaying information related to the selected task and the selected object.

11. A display device as defined in claim 1, wherein the information related to the selected task and the selected object displayed in the at least one module further includes a property page.

12. A display device as defined in claim 1, wherein the at least one module includes an indicator indicating that two of the objects in the list of objects have been selected.

13. A display device as defined in claim 12, wherein the at least one module includes an indicator indicating that one of the tasks of the list of tasks has been selected.

14. A display device as defined in claim 13, wherein the at least one module includes a work pane displaying information related to the selected task and the selected objects.

15. A display device as defined in claim 13, wherein the information related to the selected task and the selected objects comprises a property page associated with a first of the two selected objects and a property page associated with a second of the two selected objects.

16. A method of displaying functions associated with an object on a graphical user interface, wherein each function is performed by one of a set of resources in a network, the method comprising:

receiving a user request to display functions associated with the object, wherein the object is associated with an object type;

collecting first information related to static functions that are associated with all objects of the object type from a first resource;

obtaining a task handler address from the object, the task handler address identifying a second resource;

generating a request to the second resource based on the task handler address for second information related to dynamic functions associated with the object;

receiving second information from the second resource; and rendering on a display a list including static functions and dynamic functions associated with the object based on the first information and the second information.

17. The method of claim 16, wherein obtaining the task handler address further comprises:

inspecting one or more property pages of the object, each property page provided by one of the set of resources.

18. The method of claim 16, wherein collecting first information further comprises:

inspecting one or more property pages of the object, each property page provided by one of the set of resources;

obtaining a static task handler address from the object, the static task handler address identifying the first resource;

generating a request to the first resource based on the static task handler address for first information related to static functions associated with the object.

19. The method of claim 16, wherein collecting first information further comprises:

accessing a data store containing first information, the first information provided by one or more resources when the resources were installed on the network.

20. The method of claim 16, wherein collecting further comprises:

accessing a property page of the object, the property previously provided by the first resource and containing the first information.

21. The method of claim 16, further comprising:

merging the first information and the second information to create the list including static functions and dynamic functions associated with the object.

* * * * *